US011288650B2

(12) United States Patent
Glaser et al.

(10) Patent No.: US 11,288,650 B2
(45) Date of Patent: *Mar. 29, 2022

(54) LINKING COMPUTER VISION INTERACTIONS WITH A COMPUTER KIOSK

(71) Applicant: Grabango Co., Berkeley, CA (US)

(72) Inventors: William Glaser, Berkeley, CA (US); Brian Van Osdol, Piedmont, CA (US)

(73) Assignee: Grabango Co., Berkeley, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/911,311

(22) Filed: Jun. 24, 2020

(65) Prior Publication Data

US 2020/0394636 A1 Dec. 17, 2020

Related U.S. Application Data

(63) Continuation of application No. 16/015,180, filed on Jun. 21, 2018, now Pat. No. 10,740,742.
(Continued)

(51) Int. Cl.
*G06Q 20/20* (2012.01)
*G06F 9/54* (2006.01)
(Continued)

(52) U.S. Cl.
CPC ............ *G06Q 20/206* (2013.01); *G06F 9/54* (2013.01); *G06F 21/32* (2013.01); *G06Q 20/204* (2013.01);
(Continued)

(58) Field of Classification Search
CPC .. G06Q 20/206; G06Q 20/204; G06Q 20/208; G06Q 20/40145; G06K 9/00288;
(Continued)

(56) References Cited

U.S. PATENT DOCUMENTS

| 5,254,853 A | 10/1993 | Reich |
| 5,418,567 A | 5/1995 | Boers et al. |

(Continued)

FOREIGN PATENT DOCUMENTS

| BR | 102016019151 A2 | 3/2018 |
| JP | 2012008746 A | 1/2012 |

(Continued)

OTHER PUBLICATIONS

Elizabeth Weise: "How Amazon's line-less grocery services might really work", USATODAY, Dec. 8, 2016 (Dec. 8, 2016), Retrieved from the Internet: URL: https://eu.usatoday.com/story/tech/news/2016/12/06/amazon-go-surveillance-cameras-shopping-grocery-supermarket/95055200/ [retrieved on Feb. 21, 2020] *the whole document*.

(Continued)

*Primary Examiner* — Lewis G West
(74) *Attorney, Agent, or Firm* — Alpine Patents LLC; Brian Van Osdol

(57) ABSTRACT

A system and method for linking observed human activity on video to a user account of a preferred embodiment that includes: through a computer vision monitoring system, detecting and tracking a human as a computer vision modeled person within an environment, the computer vision monitoring system being part of a computing platform managing a user interaction experience; through at least one associative mechanism, establishing an association between the computer vision modeled person and at least one associative element and thereby associating the computer vision modeled person and a user-record linked through the associative element; and directing the user interaction experience at least in part based on the combination of the modeled person and at least the user-record.

38 Claims, 18 Drawing Sheets

Related U.S. Application Data

(60) Provisional application No. 62/523,183, filed on Jun. 21, 2017.

(51) Int. Cl.
*G06F 21/32* (2013.01)
*G06V 10/10* (2022.01)
*G06V 40/20* (2022.01)
*G06V 40/10* (2022.01)
*G06V 40/16* (2022.01)
*G06Q 20/40* (2012.01)

(52) U.S. Cl.
CPC ..... *G06Q 20/208* (2013.01); *G06Q 20/40145* (2013.01); *G06V 10/10* (2022.01); *G06V 40/103* (2022.01); *G06V 40/172* (2022.01); *G06V 40/20* (2022.01)

(58) Field of Classification Search
CPC .. G06K 9/78; G06K 9/00369; G06K 9/00335; G06F 9/54; G06F 21/32
See application file for complete search history.

(56) References Cited

U.S. PATENT DOCUMENTS

| | | | |
|---|---|---|---|
| 5,502,564 A | 3/1996 | Ledger | |
| 6,970,183 B1 | 11/2005 | Monroe | |
| 6,996,460 B1 | 2/2006 | Krahnstoever et al. | |
| 7,053,915 B1 | 5/2006 | Jung et al. | |
| 7,195,157 B2 | 3/2007 | Swartz et al. | |
| 7,225,414 B1 | 5/2007 | Sharma et al. | |
| 7,227,976 B1 | 6/2007 | Jung et al. | |
| 7,274,803 B1 | 9/2007 | Sharma et al. | |
| 7,283,650 B1 | 10/2007 | Sharma et al. | |
| 7,319,779 B1 | 1/2008 | Mummareddy et al. | |
| 7,505,621 B1 | 3/2009 | Agrawal et al. | |
| 7,590,261 B1 | 9/2009 | Mariano et al. | |
| 7,711,155 B1 | 5/2010 | Sharma et al. | |
| 7,734,070 B1 | 6/2010 | Sharma et al. | |
| 7,848,548 B1 | 12/2010 | Moon et al. | |
| 7,911,482 B1 | 3/2011 | Mariano et al. | |
| 7,912,246 B1 | 3/2011 | Moon et al. | |
| 7,921,036 B1 | 4/2011 | Sharma et al. | |
| 7,930,204 B1 | 4/2011 | Sharma et al. | |
| 7,957,565 B1 | 6/2011 | Sharma et al. | |
| 7,974,869 B1 | 7/2011 | Sharma et al. | |
| 7,987,111 B1 | 7/2011 | Sharma et al. | |
| 8,009,863 B1 | 8/2011 | Sharma et al. | |
| 8,010,402 B1 | 8/2011 | Sharma et al. | |
| 8,027,521 B1 | 9/2011 | Moon et al. | |
| 8,098,888 B1 | 1/2012 | Mummareddy et al. | |
| 8,189,926 B2 | 5/2012 | Sharma et al. | |
| 8,219,438 B1 | 7/2012 | Moon et al. | |
| 8,254,633 B1 | 8/2012 | Moon et al. | |
| 8,295,597 B1 | 10/2012 | Sharma et al. | |
| 8,325,982 B1 | 12/2012 | Moon et al. | |
| 8,351,647 B2 | 1/2013 | Sharma et al. | |
| 8,379,937 B1 | 2/2013 | Moon et al. | |
| 8,380,558 B1 | 2/2013 | Sharma et al. | |
| 8,396,758 B2 | 3/2013 | Paradise et al. | |
| 8,412,656 B1 | 4/2013 | Baboo et al. | |
| 8,433,612 B1 | 4/2013 | Sharma et al. | |
| 8,448,859 B2 | 5/2013 | Goncalves et al. | |
| 8,520,906 B1 | 8/2013 | Moon et al. | |
| 8,577,705 B1 | 11/2013 | Baboo et al. | |
| 8,812,344 B1 | 8/2014 | Saurabh et al. | |
| 9,120,621 B1 | 9/2015 | Curlander et al. | |
| 9,141,931 B2 | 9/2015 | Ackerman | |
| 9,161,084 B1 | 10/2015 | Sharma et al. | |
| 9,250,712 B1 | 2/2016 | Todeschini | |
| 9,262,681 B1 | 2/2016 | Mishra | |
| 9,270,634 B1 | 2/2016 | Gu et al. | |
| 9,317,785 B1 | 4/2016 | Moon et al. | |
| 9,412,099 B1 | 8/2016 | Tyree | |
| 9,426,720 B2 | 8/2016 | Cohn et al. | |
| 9,474,934 B1 | 10/2016 | Krueger et al. | |
| 9,740,977 B1 | 8/2017 | Moon et al. | |
| 9,747,497 B1 | 8/2017 | Sharma et al. | |
| 9,892,438 B1 | 2/2018 | Kundu et al. | |
| 9,911,290 B1 | 3/2018 | Zalewski et al. | |
| 9,948,902 B1 | 4/2018 | Trundle | |
| 10,055,853 B1 | 8/2018 | Fisher et al. | |
| 10,062,066 B2 | 8/2018 | Cancro et al. | |
| 10,083,358 B1 | 9/2018 | Shin et al. | |
| 10,127,438 B1* | 11/2018 | Fisher | G06N 3/04 |
| 10,133,933 B1 | 11/2018 | Fisher et al. | |
| 10,134,004 B1 | 11/2018 | Liberato, Jr. et al. | |
| 10,198,080 B1 | 2/2019 | Worley, III et al. | |
| 10,198,625 B1 | 2/2019 | Shin et al. | |
| 10,217,120 B1 | 2/2019 | Shin et al. | |
| 10,262,331 B1 | 4/2019 | Sharma et al. | |
| 10,282,621 B2 | 5/2019 | Glaser et al. | |
| 10,282,852 B1 | 5/2019 | Buibas et al. | |
| 10,296,936 B1 | 5/2019 | Saurabh et al. | |
| 10,339,595 B2 | 7/2019 | Glaser et al. | |
| 10,347,009 B1 | 7/2019 | Terven et al. | |
| 10,354,262 B1 | 7/2019 | Hershey et al. | |
| 10,380,814 B1 | 8/2019 | Mathiesen et al. | |
| 10,387,896 B1 | 8/2019 | Hershey et al. | |
| 10,474,858 B2 | 11/2019 | Davis et al. | |
| 10,832,311 B2 | 11/2020 | Chomley et al. | |
| 11,218,868 B1 | 1/2022 | Gu et al. | |
| 2001/0010541 A1 | 8/2001 | Fernandez et al. | |
| 2002/0122559 A1 | 9/2002 | Fay et al. | |
| 2003/0210340 A1 | 11/2003 | Romanowich | |
| 2003/0216969 A1 | 11/2003 | Bauer et al. | |
| 2004/0201754 A1 | 10/2004 | McAlister | |
| 2004/0260513 A1 | 12/2004 | Fitzpatrick et al. | |
| 2005/0096997 A1 | 5/2005 | Jain et al. | |
| 2005/0189411 A1 | 9/2005 | Ostrowski et al. | |
| 2006/0032915 A1 | 2/2006 | Schwartz | |
| 2006/0147087 A1 | 7/2006 | Goncalves et al. | |
| 2007/0091177 A1 | 4/2007 | West et al. | |
| 2007/0146873 A1 | 6/2007 | Ortyn et al. | |
| 2007/0242300 A1 | 10/2007 | Inai | |
| 2007/0284440 A1 | 12/2007 | Birmingham et al. | |
| 2008/0226129 A1 | 9/2008 | Kundu et al. | |
| 2008/0228585 A1* | 9/2008 | Duri | G06Q 30/0224 705/14.25 |
| 2009/0195648 A1 | 8/2009 | Thomas et al. | |
| 2010/0020173 A1 | 1/2010 | Marquart et al. | |
| 2010/0255902 A1 | 10/2010 | Goldstein et al. | |
| 2010/0280956 A1 | 11/2010 | Chutorash et al. | |
| 2010/0295946 A1 | 11/2010 | Reed et al. | |
| 2011/0122231 A1 | 5/2011 | Fujieda et al. | |
| 2011/0215147 A1 | 9/2011 | Goncalves | |
| 2012/0019168 A1 | 1/2012 | Noda et al. | |
| 2012/0027297 A1 | 2/2012 | Feris et al. | |
| 2012/0173351 A1* | 7/2012 | Hanson | G06Q 20/12 705/17 |
| 2013/0103537 A1 | 4/2013 | Hewett | |
| 2013/0147963 A1 | 6/2013 | Henninger, I et al. | |
| 2013/0177201 A1 | 7/2013 | Fisher | |
| 2013/0215116 A1 | 8/2013 | Siddique et al. | |
| 2013/0218721 A1 | 8/2013 | Borhan et al. | |
| 2013/0223673 A1 | 8/2013 | Davis et al. | |
| 2013/0262269 A1 | 10/2013 | O'Leary | |
| 2013/0284806 A1 | 10/2013 | Margalit | |
| 2013/0290557 A1 | 10/2013 | Baratz | |
| 2013/0317300 A1 | 11/2013 | Berci et al. | |
| 2013/0335571 A1 | 12/2013 | Libal | |
| 2013/0342688 A1 | 12/2013 | Siu | |
| 2014/0082519 A1 | 3/2014 | Wang et al. | |
| 2014/0082610 A1 | 3/2014 | Wang et al. | |
| 2014/0129688 A1 | 5/2014 | Asenjo et al. | |
| 2014/0188601 A1 | 7/2014 | Buset et al. | |
| 2014/0214564 A1 | 7/2014 | Argue et al. | |
| 2014/0245160 A1 | 8/2014 | Bauer et al. | |
| 2014/0263631 A1 | 9/2014 | Muniz | |
| 2014/0265880 A1 | 9/2014 | Taipale et al. | |
| 2014/0272855 A1 | 9/2014 | Maser et al. | |
| 2014/0279191 A1* | 9/2014 | Agarwal | G06Q 30/0633 705/26.7 |

(56) References Cited

U.S. PATENT DOCUMENTS

| | | |
|---|---|---|
| 2014/0285660 A1* | 9/2014 | Jamtgaard .............. G01S 17/00 348/143 |
| 2014/0297487 A1 | 10/2014 | Bashkin |
| 2014/0330408 A1 | 11/2014 | Rolley |
| 2014/0363059 A1 | 12/2014 | Hurewitz |
| 2014/0365334 A1 | 12/2014 | Hurewitz |
| 2014/0372957 A1 | 12/2014 | Keane et al. |
| 2015/0012396 A1 | 1/2015 | Puerini et al. |
| 2015/0019391 A1 | 1/2015 | Kumar et al. |
| 2015/0025967 A1 | 1/2015 | Ellison |
| 2015/0029339 A1 | 1/2015 | Kobres et al. |
| 2015/0039458 A1 | 2/2015 | Reid |
| 2015/0046213 A1 | 2/2015 | Doreswamy et al. |
| 2015/0077787 A1 | 3/2015 | Nishimura et al. |
| 2015/0077797 A1 | 3/2015 | Kurokawa |
| 2015/0088694 A1 | 3/2015 | Ackerman |
| 2015/0095189 A1 | 4/2015 | Dharssi et al. |
| 2015/0097961 A1 | 4/2015 | Ure et al. |
| 2015/0109451 A1 | 4/2015 | Dhankhar |
| 2015/0124973 A1 | 5/2015 | Arteaga et al. |
| 2015/0133190 A1 | 5/2015 | Fisher et al. |
| 2015/0138383 A1 | 5/2015 | Kelley et al. |
| 2015/0154973 A1 | 6/2015 | McKenna et al. |
| 2015/0156332 A1 | 6/2015 | Kandregula |
| 2015/0163412 A1 | 6/2015 | Holley et al. |
| 2015/0227890 A1 | 8/2015 | Bednarek et al. |
| 2015/0244992 A1 | 8/2015 | Buehler |
| 2015/0310601 A1 | 10/2015 | Rodriguez et al. |
| 2015/0327045 A1 | 11/2015 | Chang et al. |
| 2015/0373509 A1 | 12/2015 | Wang et al. |
| 2016/0012379 A1 | 1/2016 | Iwai |
| 2016/0019514 A1 | 1/2016 | Landers et al. |
| 2016/0027262 A1 | 1/2016 | Skotty et al. |
| 2016/0037135 A1 | 2/2016 | McSheffrey et al. |
| 2016/0063821 A1 | 3/2016 | MacIntosh et al. |
| 2016/0100086 A1 | 4/2016 | Chien |
| 2016/0110791 A1 | 4/2016 | Herring et al. |
| 2016/0112608 A1 | 4/2016 | Elensi et al. |
| 2016/0132854 A1 | 5/2016 | Singh |
| 2016/0173827 A1 | 6/2016 | Dannan et al. |
| 2016/0217388 A1 | 7/2016 | Okanohara et al. |
| 2016/0224856 A1 | 8/2016 | Park et al. |
| 2016/0242252 A1 | 8/2016 | Lim et al. |
| 2016/0254864 A1 | 9/2016 | Mueller et al. |
| 2016/0270191 A1 | 9/2016 | Ludwig, Jr. et al. |
| 2016/0282039 A1 | 9/2016 | Motukuri et al. |
| 2016/0289964 A1 | 10/2016 | Engberg |
| 2016/0321506 A1* | 11/2016 | Fridental ............ G06K 9/00335 |
| 2016/0345414 A1 | 11/2016 | Nolan et al. |
| 2016/0358312 A1 | 12/2016 | Kolb et al. |
| 2017/0030766 A1 | 2/2017 | Hendrick |
| 2017/0032182 A1 | 2/2017 | Motukuri et al. |
| 2017/0039613 A1 | 2/2017 | Kaehler et al. |
| 2017/0053171 A1 | 2/2017 | Buehler |
| 2017/0108236 A1 | 4/2017 | Guan et al. |
| 2017/0123030 A1 | 5/2017 | Hengerer et al. |
| 2017/0131781 A1 | 5/2017 | Buban |
| 2017/0161703 A1 | 6/2017 | Dodia |
| 2017/0169440 A1 | 6/2017 | Dey et al. |
| 2017/0178352 A1 | 6/2017 | Harmsen et al. |
| 2017/0188013 A1 | 6/2017 | Presler |
| 2017/0216667 A1 | 8/2017 | Garvey et al. |
| 2017/0249491 A1 | 8/2017 | MacIntosh et al. |
| 2017/0278175 A1 | 9/2017 | Park et al. |
| 2017/0316656 A1 | 11/2017 | Chaubard et al. |
| 2017/0323376 A1 | 11/2017 | Glaser et al. |
| 2017/0332956 A1 | 11/2017 | Bigolin et al. |
| 2018/0005044 A1 | 1/2018 | Olson |
| 2018/0012072 A1 | 1/2018 | Glaser et al. |
| 2018/0012080 A1 | 1/2018 | Glaser et al. |
| 2018/0088900 A1 | 3/2018 | Glaser et al. |
| 2018/0107968 A1 | 4/2018 | Wu et al. |
| 2018/0189763 A1 | 7/2018 | Olmstead et al. |
| 2018/0218562 A1 | 8/2018 | Conway |
| 2018/0232796 A1 | 8/2018 | Glaser et al. |
| 2018/0240180 A1 | 8/2018 | Glaser et al. |
| 2018/0245736 A1 | 8/2018 | Patel |
| 2018/0300553 A1 | 10/2018 | Khosla et al. |
| 2018/0322209 A1 | 11/2018 | Jin et al. |
| 2018/0332235 A1 | 11/2018 | Glaser |
| 2018/0332236 A1 | 11/2018 | Glaser et al. |
| 2018/0373928 A1* | 12/2018 | Glaser .................. G06F 9/54 |
| 2019/0005479 A1* | 1/2019 | Glaser ............... G06Q 20/208 |
| 2019/0028643 A1 | 1/2019 | Oryoji |
| 2019/0043003 A1 | 2/2019 | Fisher et al. |
| 2019/0054347 A1 | 2/2019 | Saigh et al. |
| 2019/0079591 A1 | 3/2019 | Glaser et al. |
| 2019/0114488 A1 | 4/2019 | Glazer et al. |
| 2019/0116322 A1* | 4/2019 | Holzer ................. G06T 19/006 |
| 2019/0156273 A1 | 5/2019 | Fisher et al. |
| 2019/0156274 A1 | 5/2019 | Fisher et al. |
| 2019/0156275 A1 | 5/2019 | Fisher et al. |
| 2019/0156276 A1 | 5/2019 | Fisher et al. |
| 2019/0156277 A1 | 5/2019 | Fisher et al. |
| 2019/0156506 A1 | 5/2019 | Fisher et al. |
| 2019/0205933 A1 | 7/2019 | Glaser et al. |
| 2019/0244161 A1 | 8/2019 | Abhishek et al. |
| 2019/0333039 A1 | 10/2019 | Glaser et al. |
| 2019/0378205 A1* | 12/2019 | Glaser ................. G06Q 20/203 |
| 2020/0066040 A1 | 2/2020 | Unnerstall et al. |
| 2020/0079412 A1 | 3/2020 | Ramanathan et al. |
| 2020/0134590 A1 | 4/2020 | Glaser et al. |
| 2020/0160670 A1 | 5/2020 | Zalewski et al. |
| 2020/0226523 A1 | 7/2020 | Xu et al. |
| 2020/0265494 A1 | 8/2020 | Glaser et al. |
| 2020/0279240 A1* | 9/2020 | Glaser ............... G06K 9/00664 |

FOREIGN PATENT DOCUMENTS

| | | |
|---|---|---|
| WO | 2016210354 A1 | 12/2016 |
| WO | 2017196822 A1 | 5/2017 |
| WO | 2019032304 A1 | 2/2019 |

OTHER PUBLICATIONS

Cao, Jing, "An End to the Checkout Line?", Valley News [White River Junction, VT], Dec. 11, 2016 (Year: 2016).

Zimmerman, Thomas G., Tracking Shopping Carts Using Cameras Viewing Ceiling-Mounted Retro-Reflective Bar Codes, Proceedings of the Fourth IEEE International Conference on Computer Vision Systems (ICVS 2006) (Year: 2006).

\* cited by examiner

LINKING COMPUTER VISION INTERACTIONS WITH A COMPUTER KIOSK

CROSS-REFERENCE TO RELATED APPLICATIONS

This application is a Continuation Application of U.S. patent application Ser. No. 16/015,180, filed on 21 Jun. 2018, which claims the benefit of U.S. Provisional Application No. 62/523,183, filed on 21 Jun. 2017, both of which are incorporated in their entirety by this reference.

TECHNICAL FIELD

This invention relates generally to the field of computer vision, and more specifically to a new and useful system and method for personalized interactivity with a shared computer vision system.

BACKGROUND

Surveillance systems have applied basic object detection and facial recognition for primitive forms of functionality. However, current surveillance systems use primitive understanding of detected people. If a surveillance system is even able to detect people, it will generally only identify the location of a person as a generic person. Facial recognition can be used in limited situations but because of the recognition reliability, only a small number of people may be detected through this. Additionally, facial recognition is currently vulnerable to adversarial attacks and so is not suitable for use in many situations. This inability to understand the observed subjects provides a significant number of limitations to uses of such systems.

Additionally, large-scale applications involving computer vision are not in active use at scale. The existing solutions described above are poorly suited for such applications. This contributes in part to the lack of rich user interactions driven by computer vision.

Thus, there is a need in the computer vision field to create a new and useful system and method for linking observed human activity on video to a user account. This invention provides such a new and useful system and method.

DESCRIPTION OF THE EMBODIMENTS

Figure 1:
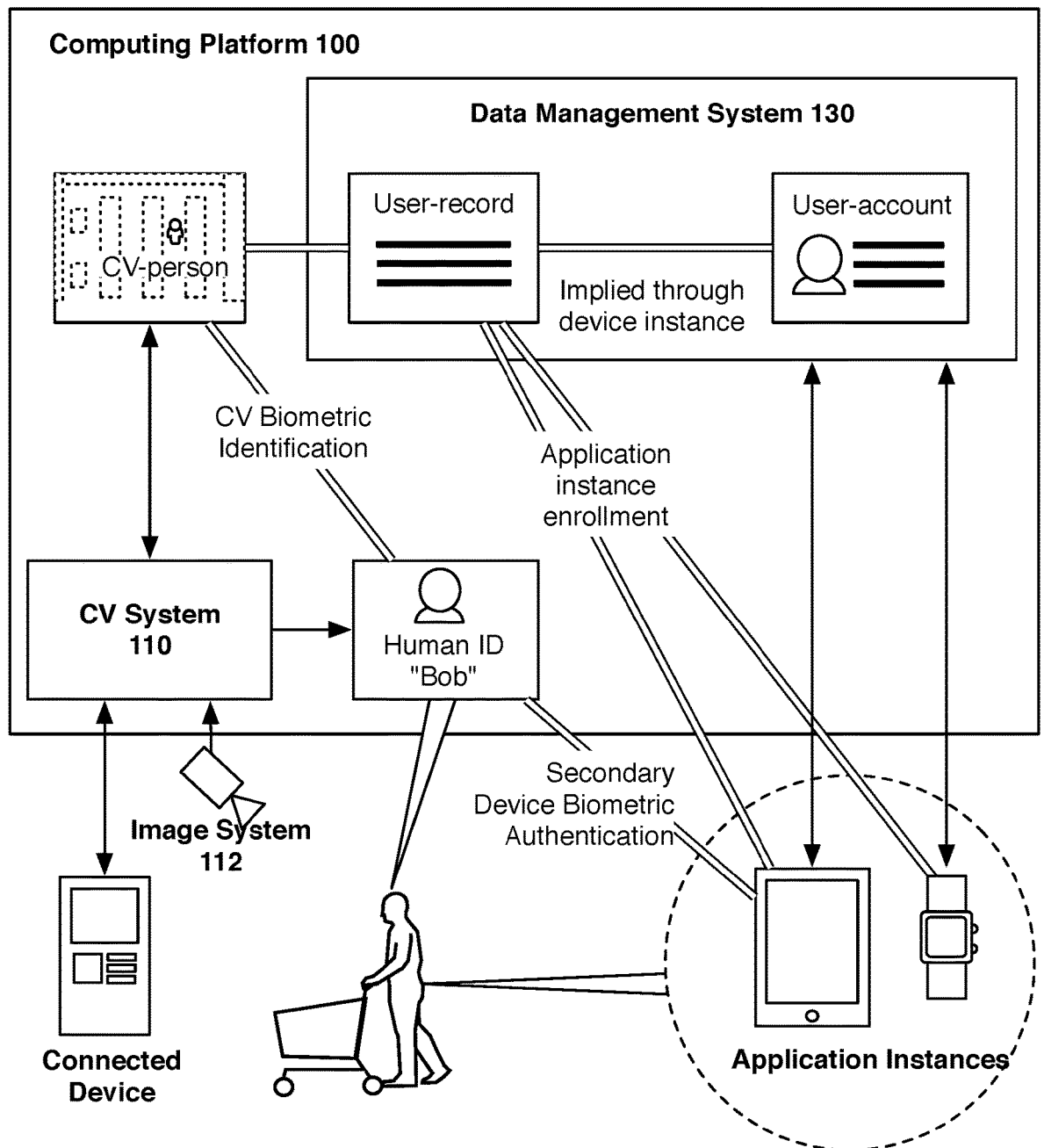
FIG. 1 is a schematic representation of an exemplary implementation of a system of a preferred embodiment.

The following description of the embodiments of the invention is not intended to limit the invention to these embodiments but rather to enable a person skilled in the art to make and use this invention.

1. Overview

A system and method for linking observed human activity on video to a user account of a preferred embodiment functions to pair, synchronize, or otherwise associate a computer vision (CV) detected and monitored person or object to some other representative construct related to that person or object. The system and method may enable novel interaction capabilities and/or enhanced user privacy and data control for advanced CV-based applications.

The system and method can be applied towards driving personalized interactivity within a shared CV monitoring system. This may enable rich user interaction experiences that are individually focused but driven in part by CV monitoring systems distributed in a shared environment. In particular, the system and method can be used in large-scale CV-driven applications where CV-based modeling of people, objects, the environment, and interactions in that environment are used across independent and personalized digital experiences of different participants. For example, these CV-driven applications can be across large environments such as a grocery store, a mall, or any suitable environment that would depend on multiple camera imaging. Furthermore, such CV-driven interactivity may be enabled ad-hoc for people in the environment.

The association(s) established by the system and method can be between a CV-person, a user-record and or a user-account, and then preferably with some other associative element. The additional associative element can be a human (wherein direct or indirect properties of a person can be used to identify a person) and/or a computing device (e.g., a physical computing device, and/or some application instance on a computing device). These associations can additionally be scoped to a particular environment or space and period of time. The system and method may additionally support operating with different types of association "topologies".

A CV-person (i.e., a computer vision modeled person) as used herein characterizes a detected and optionally tracked physical person modeled and represented by a CV monitoring system. A CV-person may, or may not, have any personally identifying information or person-associated metadata. The CV-person will generally represent the presence of a person in an environment and optionally the location, actions, activity, CV-derived properties, and/or other information based on image processing. For example, a CV-person could have a tracked location or position, body properties (e.g., pose, clothing, or other visual properties), and/or other properties. CV-detected events, gestures or states may additionally be detected in relationship to the CV-person and form part of the data model/representation of that physical person. Here a CV monitoring system characterizes an imaging system and/or processing system employing computer vision to facilitate the detection and tracking of objects, detecting actions, and performing other CV-based operations. Herein, the system and method is described as it applies to CV-based modeling of people, but a CV monitoring system may additionally or alternatively model other entities or objects such as animals, vehicles, automated devices/robots, or other suitable objects.

A user-record as used herein characterizes a computer record that is associated with a single human or being. A user-record can preferably be associated with a CV-person to uniquely identify, track, and record state of the CV-person. A user-record will preferably include various properties. Properties of a user-record may include personal identifiable information, but it may alternatively not include any identifiable information. A user-record in some implementations may also include payment information, user settings, user history, privilege settings/permissions, and/or other information. Properties of a user-record may initially use default settings that are used as placeholders until these properties can be updated. Properties may be updated as a result of association with other elements or through CV-based monitoring of the CV-person.

A user-record can additionally be used in modeling the state of an entity within a system, which will generally be directing in part a digital interactive experience. For example, in a variation of the system and method applied to automatic checkout powered by CV, the user-record may be the record used to record the items selected for purchase forming some.

A user-record can be an internal model of a human. As an internal model of a human, the user-record could be an ephemeral user-record that is preserved for essentially over the duration that the CV-person is detected in the environment. For example, a user-record can be created and updated for the duration that a shopper is present in a store. Additionally, a user-record may bridge the CV-modeling of a person across non-continuous CV monitoring of a person. For example, a first instance of a CV-person monitored in one location at one particular time period and a second instance of a CV person monitored at one location and at second time period (e.g., there may be a gap in video capture as the person enters an unmonitored area) could be associated with the same user-record. A user-record could additionally be persistent over multiple visits or system sessions, wherein a user-record may be reestablished for a human over multiple visits to the environment. As an internal model of a human, a user may not explicitly create nor have direct access to manage the user-record. In one variation, the user-record can be, include, or reference a user-account, where at least a part of the user-record may be user managed. In some implementations, the system and method may operate with a unified concept of user-record and user-account. In such an implementation, the user-record can be a user-account with user managed authentication credentials. In other implementations, verified user-accounts and ephemeral/anonymous user accounts could be used in a similar manner. Other suitable user modeling could similarly be applied.

A user-account as used herein characterizes an account in the system that can be accessed and manipulated by a user. A user-account will generally be accompanied with some authorization process such as a username and password or other authentication credentials or process. The user-account may reference a user-account of an outside system such as a social media platform. In the exemplary use case of the system applied to an automatic checkout, a user-account may be used to enable a user to register an application instance, edit payment methods, change account settings, view shopping history, edit shopping lists, and/or perform other actions. These actions can be synchronized with the user-account and can be performed outside of a CV-system, but can preferably be leveraged by a CV-system when the system and method associates a CV-person and a user-account. In some variations, a user-account could be implemented as an optional associative element for humans in the environment. CV-driven applications may handle humans with only ephemeral user-records as well as humans with user-accounts.

In some variations, a user-record can optionally include or reference (through some link or association) a user-account. In the situations where the system and method can optionally use a user-account, some humans will have only a user-record used in internally modeling state and referencing CV-related data. These humans may not have a user-account. In this exemplary situation, some other humans will have a user-record that is associated with or is their user-account. In other implementations, only humans with explicitly created user-accounts may be stored. Supporting both ephemeral/anonymous user-records and user-accounts can have the benefit of enabling ad-hoc association of a new user-account with an existing user-record. For example, a user that creates a user account in the middle of a shopping trip can gain access to their CV-based modeling (e.g., a checkout list for automatic or expedited checkout) that was tracked through a previously anonymous user-record.

As will be appreciated by one knowledgeable in the art, the exact data model architecture of such records can take many forms. Herein, a user-record will generally be used to reference the generic user-record, which may or may not have association to a user-account with authentication credentials, user-account will generally be used in situations where there is a user-created record that the user is able to authenticate into unless otherwise specified.

A human as used herein characterizes a human being with a unique identity. A human is sometimes referred to as the user, customer, worker, or other human label where appropriate. In the exemplary use case of the system applied to automatic checkout, a human can be someone who is a shopper, a worker in the store, or is otherwise present in the environment. A human could similarly generalize to other living or non-living entities such as farm animals, pets, vehicles, robots, and the like. Herein, we will primarily reference humans but one knowledgeable in the art would appreciate that the system and method are not limited to use with humans.

A device instance as used herein characterizes a unique instantiation of a stateful device present in the environment. A device instance in many cases is a computing device such as smart phone, a wearable computer, a tablet, a personal computer, or a computing kiosk/station. A device instance is preferably uniquely identifiable. In some cases, the device instance is more specifically an application instance on a device such as an application installed by a user. Here, instance is used to distinguish a unique installation and instantiation of an application on a particular device. Continuing with the use case of the system applied to automatic checkout, the application instance can be an application of the automatic checkout service that a shopper can use to view their currently selected items, to complete checkout, to modify settings, and/or perform other tasks. In some instances, the system and method can facilitate synchronizing the state of the application instance with the user-record. A device instance can additionally be computing devices accessible within the environment such as a point of sale (POS) payment kiosk, a help kiosk, or any suitable type of computing device.

An association as used herein is some variation of symbolic linking or connecting of at least two associative elements selected from the set of a CV-person, a user-record, user-account, a device instance, and/or a human. More preferably, the association is a three-element association of a CV-person and a user-record with at least one of a user-account, a device instance, and or a human. A CV-person is preferably detected and then matched to a corresponding identifying associative element. The identifying associative element can be a device instance, human, or an identifier of a user-account. The identifying associative element may then be linked to a user-record. Arbitrary complex association topologies may be established as shown in FIG. 1.

Figure 2:
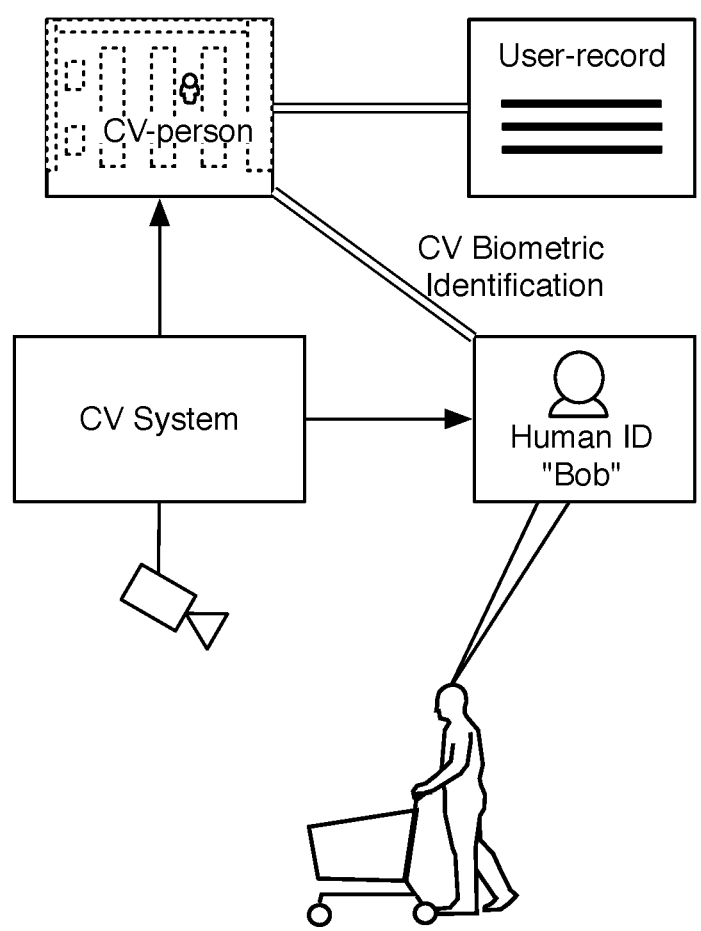
FIGS. 2-4 are schematic representations of exemplary forms of associations.

An association that includes a human association as shown in FIG. 2 can provide positive confirmation of that human. An association with a human can be through biometric detection of the human through the CV monitoring system. A human association could also be indirectly established through biometric identification through a device/application. A human association could additionally use other identifying properties of a human such as interaction patterns (e.g., shopping patterns), clothing patterns, patterns in accompanying humans, and/or other properties.

Figure 3:
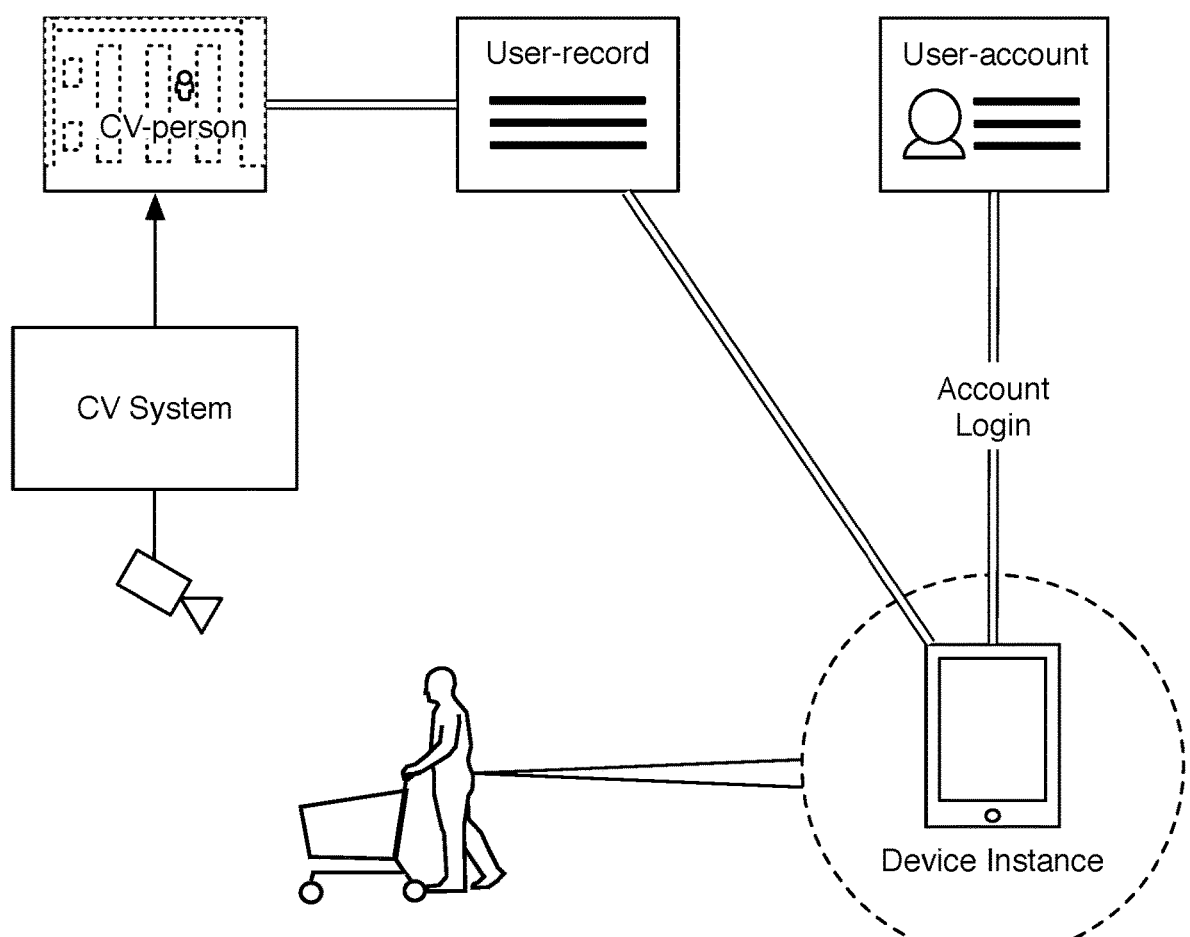

An association that includes a device instance association as shown in FIG. 3 can establish state synchronization with the device and/or application. Interactions with an app can influence the CV monitoring system and similarly detected information from the CV monitoring system can be pushed to the device or application instance.

Figure 4:
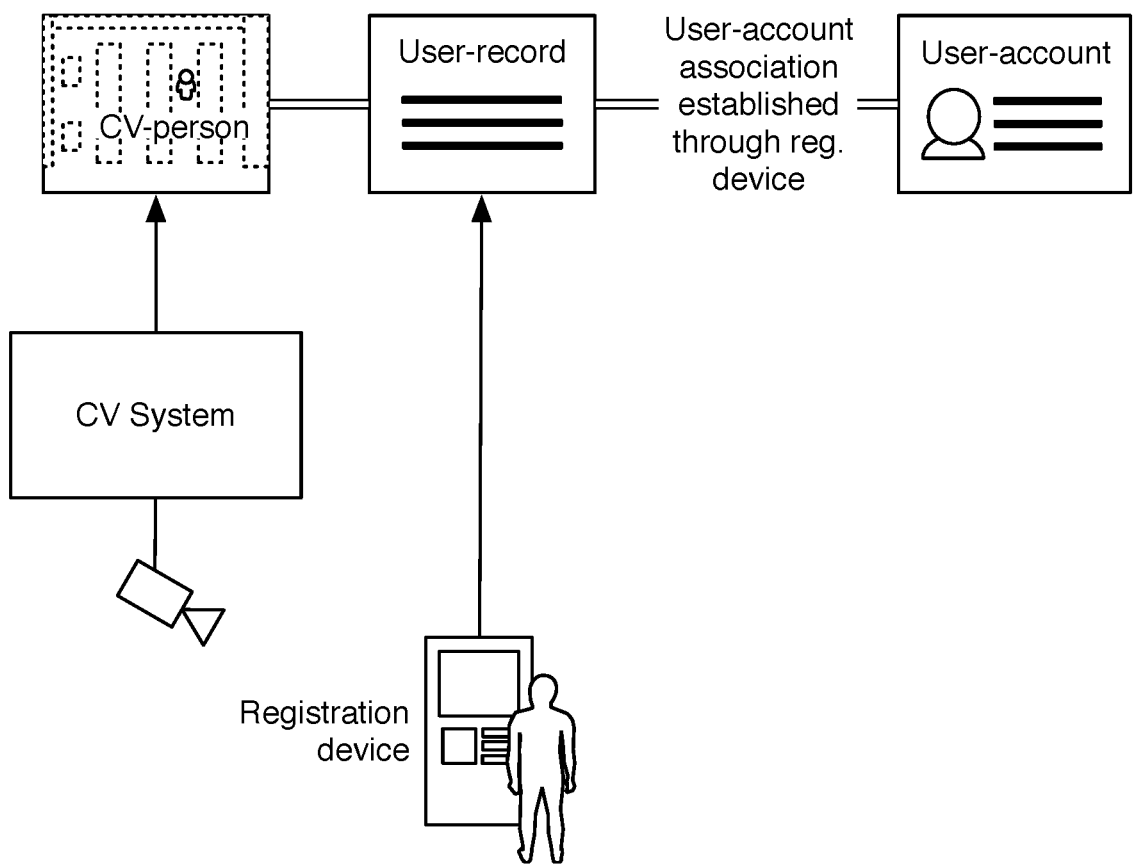

An association that includes a user-account as shown in FIG. 4 can establish state synchronization with the user-account to leverage stored user associated data and settings. Stored settings of an account can influence the CV monitoring system and similarly detected information from the CV monitoring system can be used to update the user-account.

An association with a user-record preferably provides a level of indirection between the CV-person and identifying associative elements so that CV modeling updates can be resilient to delays in establishing an identifying association or changes in associations.

An association is preferably maintained during the duration of the CV-person (e.g., duration of a shopper shopping in a store). The association is preferably maintained across multiple visits to multiple stores—the association will generally be reestablished for each visit. The system and method can facilitate the establishment and/or reestablishment of the association. An association can additionally be expanded to include other associative elements. Elements of an association could however undergo permanent disassociation (e.g., removing a device instance) or temporary disassociation (e.g., disassociating a user-account for anonymous shopping during a single visit).

An association topology generally describes a collection of associations to different associative elements. Different topologies may lend themselves to different capabilities. Different interaction experiences may also depend on or benefit from particular types of topologies. The association topology may additionally involve the type of association that was established. The type of association can be linked to different levels of identification confidence, privileges, or other aspects. For example, identification of a computing device using one technique may be treated differently from identification through another technique. Additionally, associations can be reinforced or occur at different times and/or locations to affirm the correct association. Furthermore, understanding of associations can be applied longitudinally with the monitoring of a person, which is to say, an association established at one point in time could be applied to future occurrences or retroactively applied, even altering previous state based on the new association information. In viewing the interaction experience as being based around an association topology, the system and method could additionally be extended to providing shared digital experiences and interactions for groups. In this way, multiple humans and/or multiple devices may have a shared digital experience. For example, a family shopping together would be represented as multiple CV-people, but those modeled interactions may all be linked back to a shared family user-account.

The environment as used herein characterizes the site where a CV monitoring system is installed and operational. The system and method can be made to work for a wide variety of environments. In a preferred implementation, the environment is a shopping environment such as a grocery store, convenience store, micro-commerce & unstaffed store, bulk-item store, pharmacy, bookstore, warehouse, mall, market, and/or any suitable environment that promotes commerce or exchange of goods or services. In alternate use cases, the environment can include a household, an office setting, a school, an airport, a public/city space, a gym, and/or any suitable location. The environment can be a locally contained environment but may alternatively be a distributed system with wide coverage.

The system and method may be used for any suitable video monitoring application. In particular, the system and method is for CV-based computing applications, which may include automated self-checkout, inventory tracking, security surveillance, environmental event detection and tracking, and/or other suitable applications.

Herein, automatic self-checkout is used as the main exemplary application of the system and method, but any suitable application may be used. Automatic self-checkout is primarily characterized by a system or method that generates or maintains a checkout list (i.e., a virtual cart) during the shopping process of a customer (or group of customers) with the objective of knowing the possessed items when a customer leaves a store. An automatic checkout system may additionally automatically charge an account of a customer for the total of a checkout list (e.g., predicted list of items selected for purchase). The automatic checkout system could alternatively be used to expedite entry of items for payment. The system and method as described herein can be used to synchronize a CV-person and a resulting generated checkout list (as detected in part or whole through the CV monitoring system) with a user-record, user-account, device instance, and/or a human. This could then be used to enable automatically charging of a stored payment method, authorizing purchase of restricted items (e.g., alcoholic beverages and the like), or execute other tasks.

The system and method may alternatively be used to account for the removal of a good by a customer such as in a library, a rental store, a warehouse, or any suitable item storage facility and update an associative element appropriately. The system and method may alternatively be used to permit or restrict access to locations, to charge for such access, to enable authentication with shared computing devices, or for any use case. The system can be made to work for a wide variety of shopping environments such as grocery stores, convenience stores, micro-commerce & unstaffed stores, bulk-item stores, pharmacies, bookstores, warehouses, malls, markets, and/or any suitable environment that promotes commerce or exchange of goods or services. The system and method can also be used in other situations or in other environments.

The system is primarily described as employing a network of multiple video monitoring nodes. The system could additionally be applied to a single camera and optionally audio monitoring and may additionally include other forms of sensing that may be used independently or in combination with video monitoring. These might include lidar, sonar, infrared, ultraviolet, radio frequency, capacitance, magnetic, scales, pressure, volume, climate sensing, and the like.

As one potential use, the system and method can be applied for managing permissions within a CV-based computing application. The type of association and method of establishing associations can be used in enabling or disabling different permissions. For example, establishing an association with a user-account with payment information can enable permissions for automatic self-checkout where the user can simply walk out of a store. In another example, establishing an association to a human with confirmed age verification can enable permissions for purchase of alcohol or other restricted products. Permissions may be used in managing other connected devices. For example, the system and method could be used as an authentication mechanism that alleviates a user from needing to provide login credentials when using a shared device. In another example, the system and method could use permissions to automatically unlock a door for permitted humans.

As another potential use, the system and method can be applied for synchronizing user-account data or application state to CV-based monitoring of a CV-person. For example, after establishing an association of a shopping application instance and a CV-person, a shopping list created on the application instance could then be used to inform the CV monitoring system on how to better monitor the CV-person. In another example, a checkout list may be created through monitoring of a CV-person, that checkout list can be synchronized to an application instance of the human after establishing an association with that application instance. This may even be performed independent of the user having ever used the application before or creating a user-account. This synchronization of state between a CV monitoring system and a device or application can similarly be applied to devices in proximity to or, more preferably, used by a user. For example, the system and method can be used to synchronize information with a publicly accessible kiosk when the human walks up and starts interacting with the kiosk. From the perspective of the human, the kiosk would seemingly automatically recognize them and personalize the interactions. In one variation this may be used in coordinating communication of user-record data such as a checkout list with store installed computing devices like a POS system. For example, a checkout list generated for a CV-person could be communicated to a POS system when the CV-person becomes associated with the POS system after the CV-person is within some spatial proximity of the POS system.

As one potential benefit, the system and method can enable dynamic management of permissions for CV-based computing applications. Similarly, the system and method may additionally provide multiple factors for establishing and validating associations usable in setting permissions and authenticating identity. As shown in FIG. 1, a complex association topology could be formed using different associative mechanisms. A CV identification system could identify a human as "Bob". Phone and a smart watch could be detected in one or more ways. The devices can be matched to a user-record that is associated with a CV-person. A user-account could be identified and linked based on the user-account signed into the application instances. And a fingerprint scanner on a smart phone may be used to provide human identity association using a second form of biometric identification. Other suitable topologies can similarly be formed.

Figure 5:
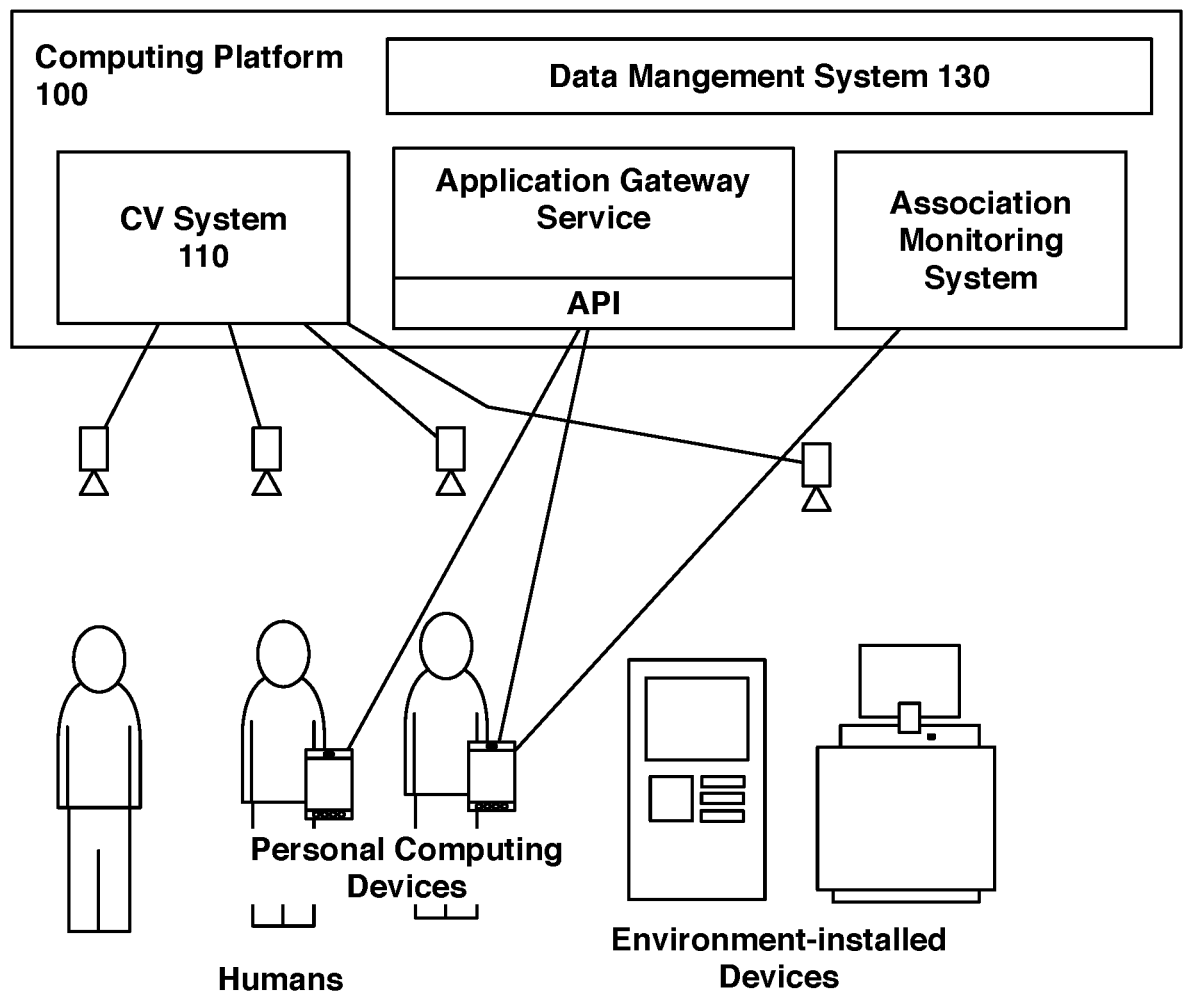
FIG. 5 is a schematic representation of an exemplary implementation of the system applied across multiple humans in an environment.

As another potential benefit, the system and method can enable richer applications within CV-based computing applications by synchronizing state and data between a CV monitoring system, accounts, devices, and/applications. In some respects, this can enable public sensing systems like the CV monitoring system to be used for private computing interactions on a personal device. In another related potential benefit, this state and data sharing coordinated through the CV monitoring system may enable personalized use of public computing devices or smart devices. These potentially real-time, personalized digital interactions can happen as a result of the system while the CV monitoring systems are also simultaneously offering such interactions across multiple humans as shown in FIG. 5.

As one isolated example of the rich interactions enabled by the system and method, a shopper without having installed any application or setup an account can enter a store powered by a CV-based automatic checkout system. By entering the store, a CV-person is established and a checkout list can be built based on the actions of the shopper. During the shopping experience, the shopper may learn of and install the application of this automatic checkout system. The system and method could automatically establish an association with that application instance and synchronize the checkout list of that shopper to their application. The shopper could then use the application to complete an automatic checkout even though the shopper only learned of the system in the middle of shopping. This example can exemplify one potential benefit of enhanced on-boarding.

As one potential benefit, the system and method can feasibly scale the number of CV-persons monitored. The number of CV-persons may be scaled indefinitely or scaled to a sufficiently high number to support the humans present in the environment. This can be particularly important to shopping environments where hundreds of customers pass through the environment on a daily basis.

As another potential benefit, the system and method can provide enhanced privacy and customization. The system and method can accommodate user customization of settings and management of data.

As a related benefit, the system and method can be flexible to gracefully handle a variety of forms of associations. Different forms of associations may enable or direct different experiences within a CV-based computing application.

In a store CV-based computing application, the system and method could establish different forms of associations that accommodate a variety of types of users ranging from low-participation customers, moderate-participation customers, and high-participation customers.

As an example of a low-participation customer, Bob does not own a phone and does not want to create an account. The system and method can still be used to create a checkout list for Bob and then synchronize the checkout list to a self-service checkout kiosk or POS station where Bob can pay through card, cash, or another mechanism. From Bob's perspective the checkout process is accelerated as a checkout list was transparently used to automatically update the checkout kiosk/POS station.

As an example of a medium-participation customer, Ellen may install an application and/or setup a payment mechanism with a user account. However, Ellen, preferring a simple experience, does not use the application in the store. The system and method can facilitate the creation of a checkout list for Ellen, associating the checkout list with her application instance and/or user account and then automatically charging the configured payment method when leaving the store. Device instance association may be established transparently from the point of view of Ellen when associating her device and thereby her user-account to the user-record. Ellen may receive a checkout confirmation message after completing her shopping.

As an example of a high-participation customer, Angela may be a heavy user of the application and setup a shopping list prior to entering the store. Within the store, Angela likes to review the current total of selected items, see the items from her shopping list not yet selected, and get information on where her next shopping list items are located. Information from the CV monitoring system can be synchronized in real-time to Angela's application and interactions within the application can similarly be synchronized to the CV monitoring system. Like Ellen she may also have a payment mechanism setup so that she can leave with being automatically billed. The system and method can assist in coordinating these interactions for Angela.

The system and method may be applied to a variety of user experiences and features. These examples are not intended to limit the system and method, which could be understood by one knowledgeable in the art.

2. System

As shown in FIG. 1, a system for personalized interactivity with a shared computer vision system of a preferred embodiment can include a CV monitoring system 110 integrated with an imaging system 112. The CV monitoring system 110 is preferably used within a computing platform 100 managing a user interaction experience. The computing platform 100 will preferably include a data management system 130 and other supplementary system elements of a computing platform 100, service, or application. The system may additionally include or interface with a user application and/or connected computing devices. In some variations, the system can include a proxy interface device 140.

A CV monitoring system 110 functions to process and generate conclusions from one or more sources of image data. The CV monitoring system 110 can provide: person detection; person identification; person tracking; object detection; object tracking; extraction of information from device interface sources; gesture, event, or interaction detection; and/or any suitable form of information collection using computer vision and optionally other processing techniques. The CV monitoring system 110 is preferably used to drive CV-based applications such as generation of a checkout list during shopping, tracking inventory state, tracking user interactions with objects, controlling devices in coordination with CV-derived observations, and/or other interactions.

The CV monitoring system 110 preferably operates in connection to an imaging system 112 installed in the environment. The imaging system 112 functions to collect image data within the environment. The imaging system 112 preferably includes a set of image capture devices. The imaging system 112 might collect some combination of visual, infrared, depth-based, lidar, radar, sonar, and/or other types of image data. The imaging system 112 is preferably positioned at a range of distinct vantage points. However, in one variation, the imaging system 112 may include only a single image capture device. The image data is preferably video but can alternatively be a set of periodic static images. In one implementation, the imaging system 112 may collect image data from existing surveillance or video systems. The image capture devices may be permanently situated in fixed locations. Alternatively, some or all may be moved, panned, zoomed, or carried throughout the facility in order to acquire more varied perspective views.

A computing platform 100 functions to coordinate or otherwise execute some application, service, or workflow. In a preferred implementation, the computing platform 100 facilitates executing a digital user interaction experience. For example, the computing platform 100 may facilitate a user interaction experience around or related to automated checkout and/or expedited checkout for customers. The computing platform 100 may include local computing resources at the environment to coordinate with devices present in the environment. The computing platform 100 may additionally or alternatively be remote computing resources wherein local computing systems in the environment communicate and coordinate over the internet (or other communication channel) with resources of the computing platform 100.

The computing platform 100 preferably includes or otherwise interfaces with the CV monitoring system 110, which functions to detect and model CV-people and/or other CV-based information. The computing platform 100 may additionally include or otherwise interface with one or more associative element monitoring system, which functions to establish an association with one or more associative element. The computing platform 100 can additionally include a data management system 130, which functions to manage and maintain user-records and/or user-accounts or other data modeling resources to support the objectives of the system.

The association monitoring system 120 functions as an associative or synchronization mechanism to establish one or more forms of association with a human and/or a computing device. In some variations, the association monitoring system 120 is part of another system element such as the CV monitoring system 110 and/or for an application service of the computing platform 100 to coordinate with a computing device instance (e.g., a user app). In other variations, the association monitoring system 120 can be an active sensing or interrogation system such as a wireless communication system, an RF/NFC interrogator, Bluetooth beacon, an audio sensor system, a specialized CV monitoring submodule, specialized application service, or other suitable type of system. In the variations that use an application instance to detect a device, the system may include an application service which functions to manage substantially real-time communication and interaction with application instances installed and operating on a user's device. The system may include one identification system, but may additionally include multiple types of association monitoring systems 120 that can be used redundantly or cooperatively.

A wireless communication system can function to monitor and detect the presence of device signatures in the environment. Multiple wireless communication units (e.g., Wi-Fi routers, RF/NFC interrogators, and the like) can be positioned throughout the store. Their distributed location can be used to correlate the detection of a device signature with at least an approximate location. Bluetooth beacons could be used in a similar manner.

A specialized CV monitoring submodule can perform some form of CV-based analysis to assist in detecting. In one variation, this may include performing biometric identification or classification of CV-person. One specialized CV submodule could perform activity classification or modeling for a CV-person which could be matched to motion patterns detected from a special motion detection application service enabled on a device. In a similar manner, a CV monitoring submodule could detect particular gestures performed by a user. Another specialized CV monitoring submodule could detect visual patterns displayed by a computing device. A variety of types of CV monitoring submodules may be use.

An audio sensor system may function to detect audible signals in the environment. In one variation, audio signals detected by a computing device could be mapped to audio signals detected by microphones installed throughout the store. This could be used in determining approximate location. In some instances specialized and potentially nearly inaudible signals could be output by the computing device and/or speakers in the environment. Detection of these unique signals by the device and/or microphones distributed in the environment could function to determine location and thereby selecting a candidate pool of CV-people for a computing device.

The data management system 130 functions to store user-records and/or user-account information. The system will generally include other elements to support the CV-based computing application and/or to provide a platform for CV-based computing applications implemented in multiple stores and/or for different use cases. The user-records and/or user-accounts may be linked or otherwise pre-associated with one or more types of identifying associative elements. For example, CV-based identification of an individual may generate an identity signature that is associated with a user-record. In another example, an identifier for a particular device instance may be associated with a user-record such that when that device instance is detected in the store, the mapped user-record can be identified and accessed.

User Applications and/or connected computing devices function as client devices that may participate in CV-based computing applications. In a preferred implementation, a user application of the store and/or operator of the CV monitoring system 110 can be made accessible to users of the CV monitoring system no (e.g., customers of a store). The user application can facilitate associating a user-account, providing biometric authentication through the device (e.g., fingerprint, voice recognition, facial identification or other forms of biometric authentication), collecting user input, and/or performing other tasks. A connected computing device can be computing devices that may be installed or provided within the environment. The connected computing devices may be customer service kiosks or stations, networked smart devices (e.g., smart lock, smart lights, etc.), a worker station, and/or any suitable computing devices.

A user application instance or a connected computing device are preferably addressable endpoints within the system such that the CV-system or an alternative component can transmit data or information can be communicated to the user application instance or the connected computing device. An SDK and/or API may be provided such that third party applications can establish such integration with a CV monitoring system no and/or platform.

The system may additionally include computing devices installed within the environment. In one variation, the environment-installed computing devices are configured and directly integrated with the system and computing platform such that they can be accessed and controlled at least in part. In another variation, the system may include a proxy interface device that functions as a gateway or edge device that facilitates communication and interactions with outside devices. In this variation, existing computing devices like a POS system could be used with the system without making direct changes to the existing computing devices.

The proxy interface device 140 of a preferred embodiment functions to be a system controllable device/resource that interfaces with environmentally installed computing infrastructure. In some variations, the proxy interface device 140 impersonates an expected form of data entry. A preferred variation of the proxy interface device 140 is used to interface and augment an existing payment system. In one variation, the proxy interface device 140 is used expediting the checkout process by assisting in the entry of product information into an existing POS station. In another variation, the proxy interface device 140 may be used in assisting in delivering pre-authorized payment mechanisms so that a user could pay possibly without any explicit action (other than perhaps confirming payment/purchase).

Interfacing with an environment-installed computing device and/or a proxy interface device 140 would have applications in other areas as well. For example, in a restaurant, a digital ordering kiosk could automatically bring up a customized ordering interface (e.g., showing customer order history, starred items, personalized recommendations, loyalty reward options) based on CV-based identification of the user. In a gym, a user may be able to walk up to a device distributed through the gym and a personalized user interface can be automatically presented based on CV-based identification of the user and/or previously tracked activity in the gym. In an airport setting, a check-in kiosk could be controlled to automatically enter ticket information. These and other applications could be implemented through the system and method using a proxy interface device 140 and/or directly connecting to the appropriate computing device.

A proxy interface device 140 preferably emulates an input device for a target computing device. For example, the proxy interface device 140 could be a keyboard or barcode scanner emulator (i.e., product entry emulator). The proxy interface device 140 may alternatively communicate data that then uses an installed service to communicate with or otherwise interact with a target computing device.

A proxy interface device 140 preferably includes a communication module and a device interface module. The proxy interface device 140 may additionally be delivered as an attachment device encased within a body structure. The proxy interface device 140 may additionally include additional ports. In the checkout station use case, the proxy interface device 140 can include a product entry interface module so that the proxy interface device 140 can be connected between a barcode scanner and a checkout station.

The proxy interface device 140 communicatively couples the system (more specifically the CV-based monitoring system) with a computing device. A preferred implementation, the computing device is a point of sale checkout station, but the communicatively coupled computing device could be any suitable type of computing device such as an informational computing kiosk or computing devices for other purposes.

The communication module functions to allow the device to be remotely controlled. The communication module can preferably communicatively couple with the CV-based monitoring system. The communication module is preferably a wireless communication module where the wireless communication module can include Wi-Fi communication module, a Bluetooth or RF communication module, a cellular communication module, or any suitable type of communication module. The communication module could additionally be a wired communication module wherein the proxy interface device 140 communicate over a wired or physical connection.

The communication module is preferably registered to the CV-based monitoring system. The communication module can additionally be registered in association with a target computing device. The location and/or target association could be registered during an enrollment period. As part of the enrollment process, the proxy interface device 140 could be registered and manually, automatically, or semi-automatically associated with that location and connected computing device (e.g., a POS station). In one variation, the proxy interface device 140 could include an active or passive identifier to announce itself to the CV monitoring system for registration and location determination.

The device interface module, which functions to communicatively connect or interface to one or more computing devices. In one variation this could be a wired connection. In one example, the proxy interface device 140 connects to a POS station through a port typically used by a barcode scanner. In some implementations it may replace a connection of a barcode scanner. In other implementations it may be connected to the POS in addition to one or more barcode scanners. In another variation, the proxy interface device 140 and/or the computing platform more generally can wirelessly communicate with a computing device like a checkout station.

The proxy interface device 140 may connect to a checkout station through the device interface module using a standard electrical interface like a USB interface or other data port. The proxy interface device 140 and more specifically the device interface module can generate and transmit the appropriate electrical signals for communicating with the checkout station. Product entry module in a preferred implementation can transfer the universal product codes (UPCs) of the modeled checkout list. For some POS stations this can be UPCs communicated as simulated keyboard entries. These can be transferred in some serial sequence such that from the POS station it appears as rapidly entered products. The product entry emulator may additionally include an interface to one or more product entry devices (like a barcode scanner or a keyboard) such that the product entry emulator can be used in line with such entry devices as shown in FIG. 17.

The product entry interface module can be a corresponding communication port to that used by the device interface module. This is preferably used so that use of the proxy interface device 140 preserves the option of the checkout station from using existing infrastructure like a barcode scanner. Accordingly, the product entry interface module could be a female USB port. Data received through this port may be automatically relayed through the device interface module to the connected computing device. Additionally or alternatively, data received through the product entry interface module can be captured and/or optionally processed. In a preferred implementation, UPC data collected through the product entry interface module can be relayed to the connected checkout station, but also communicated to the computing platform. This can be used as training data for CV, AI, and/or machine learning algorithms. Especially since, product information received through the product entry interface module will generally occur when there was an exception or issue with generating a checkout list.

The proxy interface device 140 can preferably be encased in a rigid structure. The proxy interface device 140 will additionally include a microprocessor or other form of processing unit along with memory, power system, and/or other suitable elements. The proxy interface devices 140 may be used for each checkout station. Alternatively, a single proxy interface device 140 may interface and manage multiple checkout stations.

The proxy interface device preferably includes user interface elements. The user interface elements are preferably provided to communicate with a user of the connected computing device. For example, the user interface elements can function to facilitate conveying system state and optionally collecting user input from a worker managing a POS station. User interface elements may additionally or alternatively be configured for use by other users like a customer.

In one preferred variation, the user interface elements include one or more forms of a user interface output. A user interface output could be a visual output, an audio output, a tactile output, and/or any suitable type of output.

A visual output could be some form of a visual indicators (e.g., LED lights or gauges) or even a graphical display. In one implementation, an indicator light(s) could signal when a checkout list is transferred/received for updating a POS system. For example, the display could blink green when a customer's selected items are automatically entered into a POS station thereby signaling to the worker that they do not need to scan items for entry and proceed to finalizing payment. Additionally or alternatively, the visual output could indicate when a checkout list cannot be automatically entered, if part of the checkout list can/was entered, and/or any other suitable exception. In another implementation, a graphical display could visually display the virtual checkout items that were relayed or suggested for being relayed to a POS station. The worker may even be requested to verify the list and select an option to enter them into the POS station. Changes could be made if a mistake was made. These changes could be relayed back to the CV-based monitoring system as feedback for quality control and monitoring enhancements.

An audio output could be used along with a visual output or by itself. An audio could be an audible tone or signal that triggers for different events. For example, there could be a tone or jingle that plays when a customer with valid checkout list approaches the "primary position" of the POS station (i.e., the person/group ready for checkout) which can indicate to the worker that they can skip the scanning/entry of items. Similarly, a tone may play when a checkout list is not available or not valid for entry, which can indicate to the worker that they should manually enter items selected by the customer.

The user interface elements could similarly include user input elements like buttons, dials, touch screens, microphone (for audio commands), and the like. These may be used in various ways to allow the worker to input information or communicate with the system. In one implementation, items are not automatically entered into a POS station until a worker positively confirms the items for entry.

A preferred variation of the proxy interface device is one that interfaces with a POS station for the purposes of relaying item information based on a checkout list generated by the CV-based monitoring system.

3. Method

Figure 6:
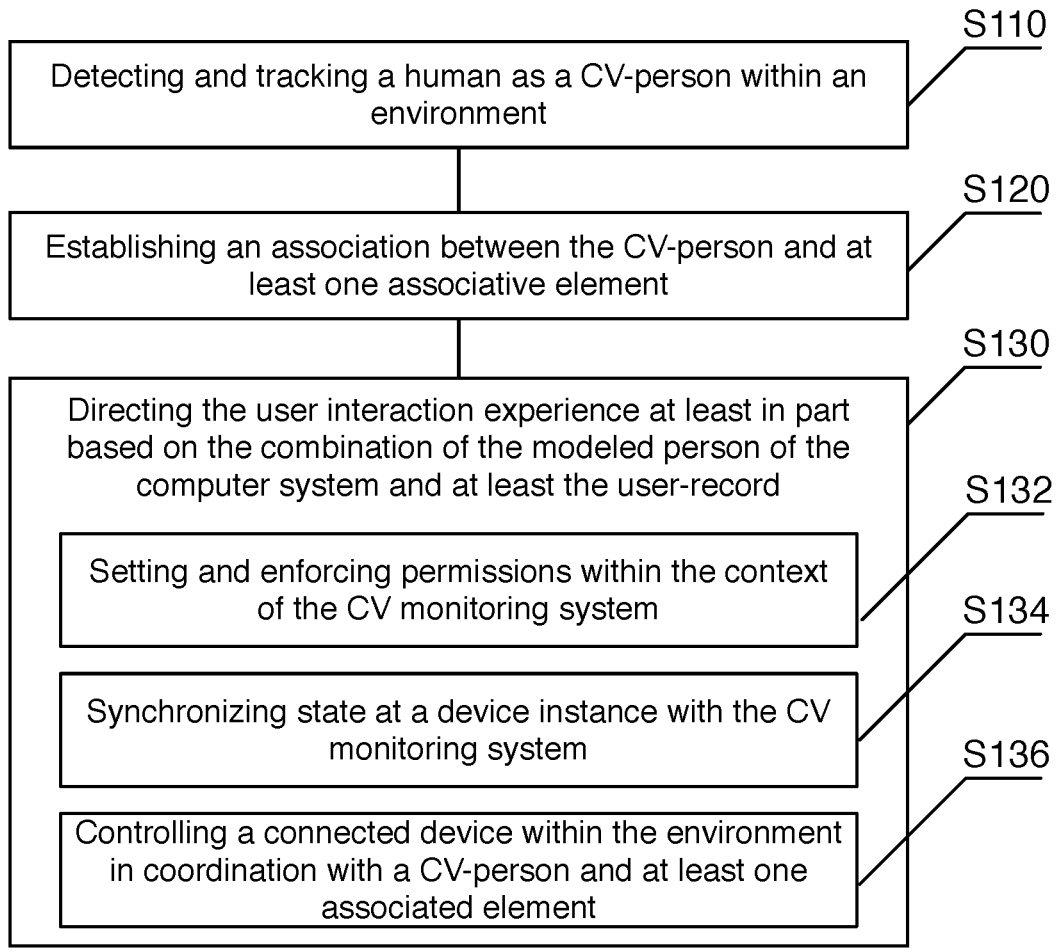
FIG. 6 is a flowchart representation of a method of a preferred embodiment.

As shown in FIG. 6, a method for linking observed human activity on video to a user-record within a computing platform used for managing a user interaction experience of a preferred embodiment can include detecting and tracking a human as a CV-person within an environment S110, establishing an association between the CV-person and at least one associative element S120, and directing the user interaction experience at least in part based on the combination of the modeled person of the computer system and at least the user-record S130. Establishing an association between the CV-person and at least one associative element S120 further comprises wherein the association with the associative element is thereby used in associating the CV-person and a user-record linked through the associative element. One or more association mechanism can be used in detecting the associative element. The method can be applied to setting and enforcing permissions within the context of the CV monitoring system S132, for synchronizing state at a device instance with the CV monitoring system S134, and/or for controlling a connected device within the environment in coordination with a CV-person and at least one associated element S136. The method is preferably implemented by a system as described above, but any suitable system may implement the method.

Block S110, which includes detecting and tracking a human as a CV-person within an environment, functions to establish a CV-person within an environment. Block S110 is preferably implemented through or in connection with a CV monitoring system, which could be part of a computing platform such as was described above. Detecting and tracking a human as a CV-person preferably includes collecting image data and applying person detection computer vision processing to the image data.

Image data is preferably collected and then processed by the CV monitoring system. When a human enters an environment with an operating CV monitoring system, the CV monitoring system can acquire the human as a CV-person. That CV-person can be tracked during the human's time in the environment. Continuous tracking may be maintained, but the system could additionally handle discontinuous tracking where tracking of a CV-person may be lost temporarily and then reacquired. Modeling of a CV-person is preferably abandoned, expired, or made inactive after the CV-person exits an environment.

Detection and tracking are preferably facilitated through various computer vision approaches. In one implementation, tracking may be achieved through a visual "lock", wherein movement between frames of a detectable CV-person can be tracked. A physics or modeling system can be introduced to facilitate tracking the CV-person across frames and to recover when a user is temporarily or partially occluded.

Detection and tracking may additionally use human identification. Human identification can include biometric identification such as facial identification, gait identification, voice identification and the like. Human identification may additionally include more general characterizations of a human such as visual properties, clothing properties, height and weight estimations, age estimation, and/or possession properties (e.g., holding a bag, using an identifiable shopping cart, etc.). Human identification can be used to uniquely identify a human but may additionally be used to reduce the possible candidates of if not uniquely identifier the identities of humans within an environment. Tracking a CV-person could use human identification to assist in reacquisition of that CV-person.

In addition to detecting and tracking of a CV person, the CV-system can additionally provide additional CV-based analysis of the image data such as object detection, object-human interaction detection/classification, human gesture detection, and/or other suitable forms of CV-based modeling based in part on the image data. For example, in a shopping environment, the items selected by a CV-person and/or added to a cart of a CV-person can be added to a checkout list, which can be modeled and stored in association with that CV-person. The CV monitoring system can sense and generate predicative models based on image data and supplementary data sets (e.g., shopping history, user profile information, product information, etc.). The CV monitoring system may additionally work in combination with other sensing systems such as a smart shelving system with sensors, an RFID sensing system, 3D spatial sensing system, and/or any suitable type of environmental sensing system.

Block S120, which includes establishing an association between the CV-person and at least one associative element, functions to synchronize and/or link a computer vision derived model of a human to at least one other data model related to the human. Preferably, at least one association is established to an associative element. This associative element may function as a human identifier or entity identifier. In some variations, this human or entity identifier could be token-based (e.g., like a device associated with the human), biological-based, or pattern-based (e.g., behavioral pattern detection). In general, the method is preferably executed so as to establish an association with a user-record and/or user-account.

Block S120 may occur at any suitable time and/or place in the environment. Additionally, multiple types and/or instances of associations may be established for a particular human. In some variations, multiple associations may be established at different times, which can work to provide multiple factors of identification and/or to appropriately augment the confidence of a mapping between a CV-person and a user-record. These associations can additionally act as additional factors in having high confidence in other associations like when associating a CV-person with environment-installed computing devices like a checkout station.

Establishing an association with a user-record and/or user-account is preferably established through at least one identifying associative element like a device instance, application instance, and/or a human identifier. One or more associative mechanisms may be used to establish the association. With an association established to an identifying associative element, the identifying associative element can be used to indirectly establish an association with an appropriate user-record or user-account. The user-record or user-account can be stored and queried using a key, identifier, signature, or properties acquired from the identifying associative element. Accordingly, block S120 will generally include establishing an association between the computer vision modeled person and at least one associative element and thereby associating the computer vision modeled person and a user-record linked through the associative element. Effectively, the method establishes a three-element association between: a CV-person; one or both of a user-record and user-account; and at least one of a device instance, an application instance, and/or a human identifier.

An association to a user-record, which may specifically be a user-account, can expand the understanding of a CV-person to platform-managed data and/or to a historical record of the human entity. In an automated checkout implementation, payment information, shopping history, personalized loyalty program rewards, and/or other information may be exposed for use in combination with CV modeled data.

An association to a user-record is preferably made in connection with some identifying association such as with a device instance association or association with human identity.

An association to a device instance (or in some variations an application instance) can facilitate identifying a human associated device. The association with the device instance may further enable a communication link between the CV monitoring system and a device and/or application that is accessible to the corresponding human. An association to a human identity may enable authentication of the identity of the human corresponding to the CV-person. In one variation, an association to a human can be performed directly through CV-driven analysis of the CV-person. For example, biometric identification may be used. In another variation, authentication and more specifically biometric authentication may be facilitated by an accessible computing device such as a personal computing device or kiosk using biometric authentication.

Figure 7:
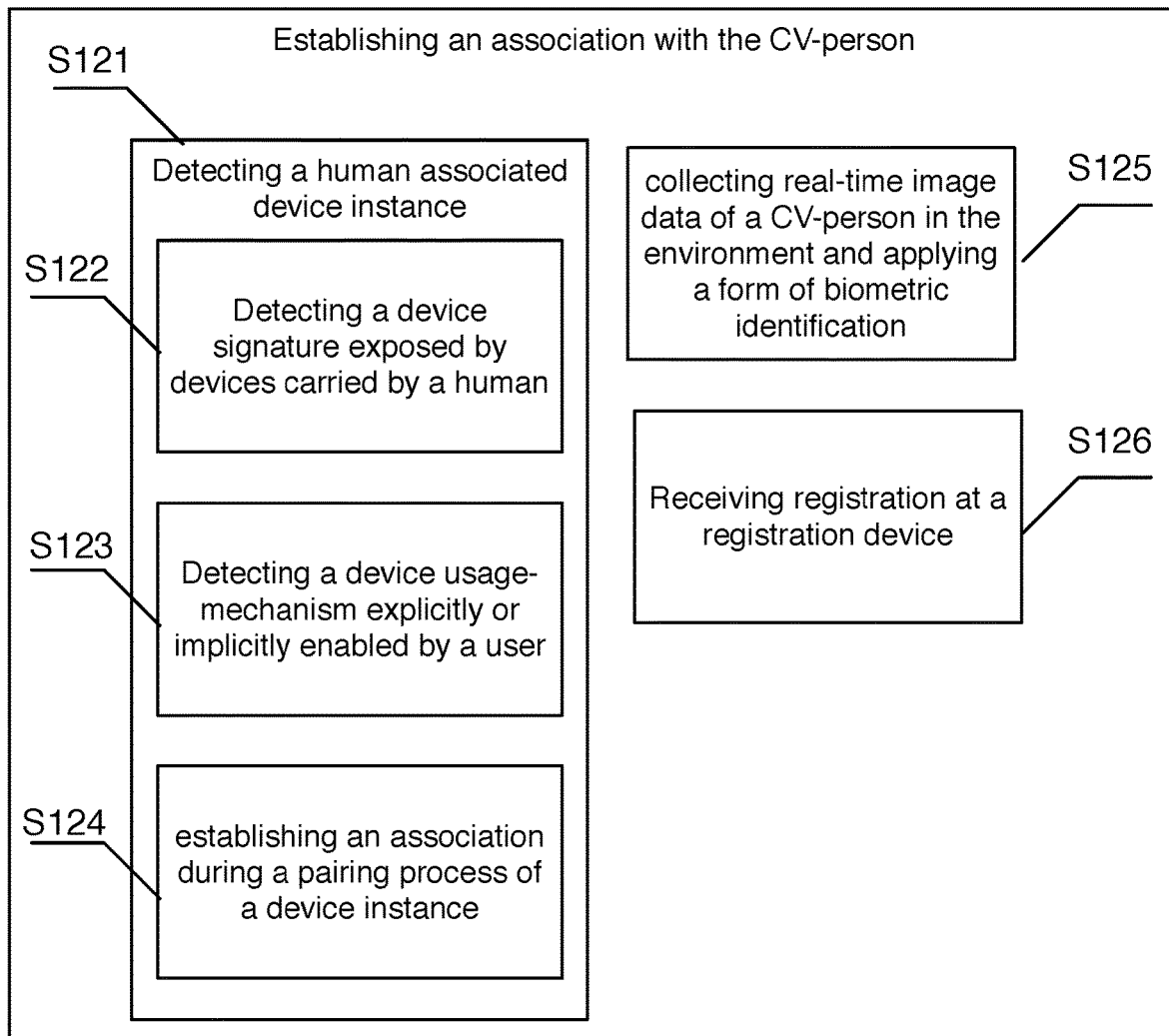
FIG. 7 is a flowchart representation of a variations of establishing associations.

Establishing an association with a CV-person can involve the use of one or more associative mechanisms for establishing associations. Different associative mechanisms may have different levels of reliability, security, and/or be usable for adding associations to different associative elements. A subset of these associative mechanisms may be classified as system initiated associative mechanisms and another subset of associative mechanisms may be classified as user-initiated associative mechanisms. Establishing an association may involve include executing variations of such associative mechanisms as shown in FIG. 7.

System-initiated associative mechanisms can leverage natural conditions without depending on some form of active user participation to work. System-initiated associative mechanisms can be used in automatically establishing at least part of an association. They will generally operate in the background and may be transparent to a user. System-initiated associative mechanisms may be used in establishing an association automatically—possibly without active participation by a human at the time of association. Three potential types of system-initiated associative mechanisms can be biometric, passive, and active.

A biometric type of system-initiated associative mechanism preferably uses biometric input collected in real-time from a CV-person in the environment. This biometric identification can preferably be performed remotely through the image data used by the CV monitoring system. Biometric identification may be used in combination with other associative mechanisms to increase the confidence in biometric identification. For example, using device signature detection and/or gross device location information, the candidate pool of user identities can be reduced such that the confidence in biometric identification can be made more resilient. A facial recognition CV process could be configured to identify a face out of a pool of 300 candidates near the store location as opposed to millions of potential candidates encountered at some time across many sites.

A passive type of system-initiated associative mechanism can be an "always on" technology that is typically exposed by a computing device carried by a human. These signals may be unique to each device or at least provide distinguishing features within a limited sample of devices, and therefore can be used to form connections between devices and CV-persons with a relatively high degree of certainty. Passive associative mechanisms may not establish a positively confirmed association in some situations since devices can be shared or stolen, but passive background device detection may be used to establish a probabilistically likely association and/or to narrow the scope of associative elements for other association techniques like the automatic biometric analysis above. Such signals can include Wi-Fi, Bluetooth, MAC addresses, cellular signature and the like. Such signals may not be 100% accurate associations because smart devices can be shared or stolen by different humans. However, such signals can at least be useful with humans during a single visit. They may additionally be useful device signatures for humans with a personal computing device but without an installed application and/or without a user-account For example, a human without installing a user application on their smart device can have a smart device passively facilitate associating a CV-person to a device instance and by association a user-record with purchase history and payment information.

An active type of system-initiated associative mechanism may be some user installed or initiated technology, which, in some cases, can affirmatively link CV-people with a computing device. This variation of system-initiated associative mechanism may operate without explicit device usage by a human while in the store. However, they may depend on installing an application, installing or enabling a service. Bluetooth LE beaconing, background app refresh, geofencing, GPS or relative GPS, other location services, and/or other device functionality may expose signals by which a device could be detected and associated with a user-record or user-account.

Use-initiated associative mechanisms can include an associative mechanism dependent on user action. One variation can be device-based initiation. Other forms of user-initiated associative mechanisms can be various forms of user check-ins.

Some preferred associative mechanisms could include detecting a human associated device instance S121 and/or collecting real-time image data of a CV-person in the environment and applying a form of biometric identification S125, and/or receiving registration at a registration device S126. Some preferred variations of detecting a human associated device instance S121 can include: detecting a device signature exposed by devices carried by a human S122, detecting a device usage-mechanism explicitly or implicitly enabled by a user S123, and establishing an association during a pairing process of a device instance S124.

Block S121, which includes detecting a human associated device instance, functions to use the presence of an identifiable device to establish an association. Block S121 will generally involve: through a device identification system, detecting a device instance coincident to the CV-person and then selecting a user-record by an identifier of the device instance. This functions to associate the CV-person, the device instance, and the user-record. Here, the device instance could be some human identifiable device such personal computing device like a smart phone, a personal computer, a wearable computer, and the like. The device instance could alternatively be an instance of an application installed on a device, a browser session, or any suitable client detectable and associated with a user. In some variations, the device instance could be a shared environment-installed computing device. A shared computing device will have shared usage by multiple users at different instances. A shared computing device may be directly used by the human when establishing the association (e.g., an informational kiosk or self-checkout station). The shared computing device may alternatively be used to serve a particular human when establishing the association (e.g., a worker-staffed checkout station).

Here, the condition of coincidence characterizes some form of associated proximity, which could include spatial proximity and/or temporal proximity. A device instance may be spatially coincident when the device instance is detected in a location that corresponds to a modeled location of the CV-person. Detection of a device is preferably isolated to a particular region or location. This location can be mapped to a corresponding location in the environmental model of the CV-system. If a CV-person is detected in the corresponding location, an association can be established between the device and the CV-person. Depending on the spatial resolution of either the device instance or the CV-person, different thresholds of proximity may be used. In some cases, gross spatial proximity (e.g., detected within 50 feet range of each other) can be sufficient such as when the pool of possible candidate pairings of CV-people and device instances is not high. A device may be temporally coincident when the device instance is detected within a similar time window. For example, if a device instance is detected in the environment within one minute of detection of a CV-person then those could be paired.

In a crowded environment, device detection may occur at multiple locations in an environment and a CV-person association to a device instance can be established through longitudinal analysis of past instances of device detection. This can include looking at the tracked movements of a device instance, analyzing the sets of candidate device instances and CV-people, and/or using other suitable techniques. For example, a device may be detected at the entrance of a store. However, there may be multiple candidate CV-people so a confirmed association may not be established initially. The same device instance may be detected at a second location. Even if the number of candidate CV-people is still large, the CV-people detected at the entrance and the second location can narrow the candidate CV-people.

Detecting a device instance may be used in identifying and selecting a corresponding user-record associated with the device instance. In one variation, the device instance may provide some distinguishing key or identifier by which a user-record stored in association with that identifier can be found and accessed. In this variation, the detection of a device instance can be used to re-establish a previous user-record. This accessed user-record can be merged with or replace a current associated user-record.

Furthermore, a device instance may be used in establishing an association with a user-account. In some cases, the application instance may be associated with a user-account (e.g., if a human has signed into their account within the application), wherein, establishing association to a device instance will by association establish a user-account association. Accordingly, using a device instance to establish an association with a user account may include authenticating a user-account at the device instance; selecting a user-record based on the user-account authenticated on the device instance when the device instance is detected. The computing platform will generally have access to the device instance and therefore could map the user-account logged into the particular device instance with the CV-person.

Similarly, a device instance and/or an application instance can facilitate human identification and so may be establish a validated association with a human. This human association with the application instance can be transferred to an association with a CV-person as well. For example, fingerprint identification, facial identification, voice identification, or other forms of biometric identification performed within the application instance can establish human identity association.

Detection of a device instance may be performed through a variety of approaches. As discussed above, the block S121 may include detecting a device signature exposed by devices carried by a human S122, detecting a device-usage mechanism explicitly or implicitly enabled by a user S123, and/or establishing an association during a pairing process of a device instance S124.

Block S122, which includes detecting device signatures exposed by devices carried by a human, functions to facilitate passive background device detection. Passive background device detection is preferably used in establishing an association to a device instance through exposed communication device signatures. Device signatures preferably include communication signals from a device that are generally unique to a device and therefore can be used to form associations between a device instance and a CV-person. A device signature can be detectable properties or identifiers exposed over Wi-Fi, over Bluetooth, through MAC addresses, through cellular signals, and/or other exposed emissions. Block S122 can preferably operate as a system-initiated associative mechanism, and may be used to assist providing enhancement functionality to users even if they are not registered or enrolled with a user-account. As a user-initiated association, the user may set some option to enable (or disable) the user of device signatures. If a device instance was previously associated with a device-record or more preferably a user-account, then the device signature can be used in establishing associations to other associative elements. Block S123, which includes detecting device usage mechanisms explicitly or implicitly enabled by a user, functions to facilitate user-enabled background device detection. There are various options that when activated by a user will facilitate automatic establishment of associations when that particular user. In one variation, a user may explicitly enable geofencing to automatically detect when they enter a store. In another variation, a user may implicitly enable a detection mechanism by registering a user-account to access Wi-Fi in the environment. In another variation, a user may enable kinematic monitoring for synchronizing human motion to CV-person motion. These options may depend on a user installing an application and/or enabling or confirming particular device permissions.

User-enabled background device detection can be performed substantially similar to passive background device detection described above. However, user-enabled background device detection may use detection approaches like Bluetooth LE beaconing, background app refresh, geofencing, LED positioning, GPS, relative positioning in the environment, and the like.

With techniques like Bluetooth beaconing and geofencing, the system may be actively notified when the device instance is present in the environment. With knowledge of the presence of a device instance, that device instance and previously associated humans, user-accounts, and/or user-records may become candidates for associations with a CV-person.

Figure 8:
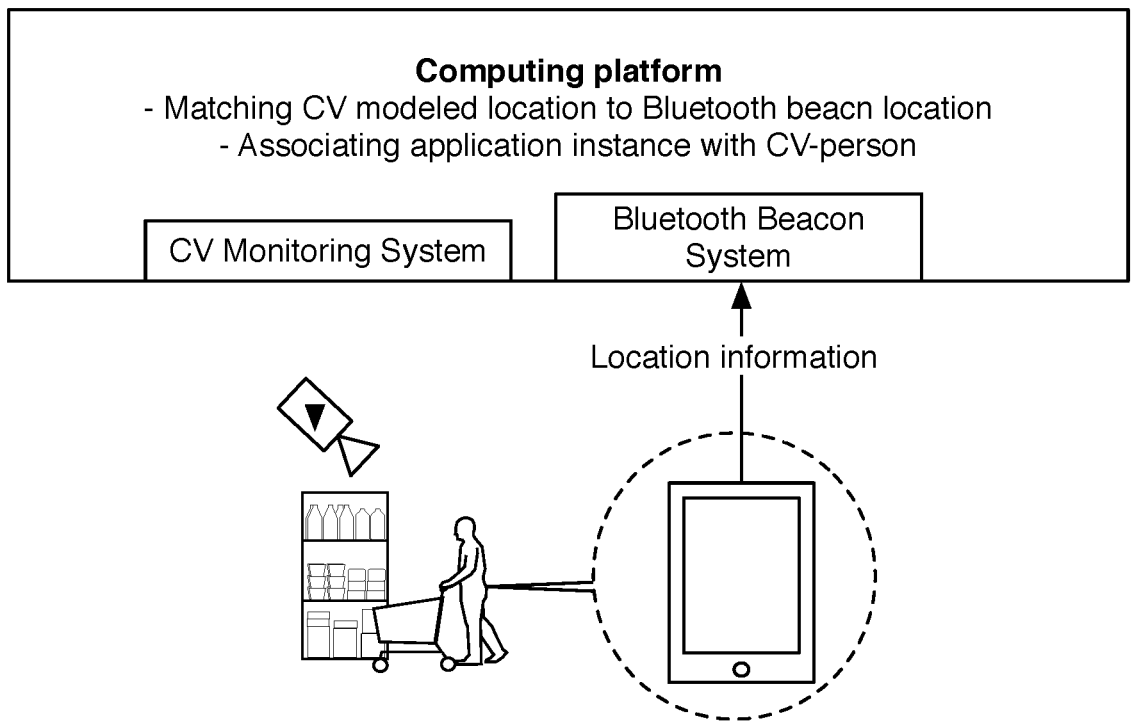
FIGS. 8 and 9 are schematic representations of exemplary variations of establishing an association with a device instance.

When using Bluetooth beaconing, detecting the device instance can include detecting location and/or presence of an identifiable device instance. The location information can be matched to CV-people with corresponding locations as shown in FIG. 8. When Bluetooth beaconing is used in multiple locations, a CV-person can be mapped to and associated with a device instance when there is a unique correspondence of coincidence across a set of detection events. When there is only one CV-person in the region of a first beacon during a first detection event, then the detected device instance and CV-person can be associated. When there are multiple people during multiple detection events, a CV-person can be associated with the device instance if the CV-person is the uniquely present CV-person in the regions of the various beacons at the time of the detection events.

Figure 9:
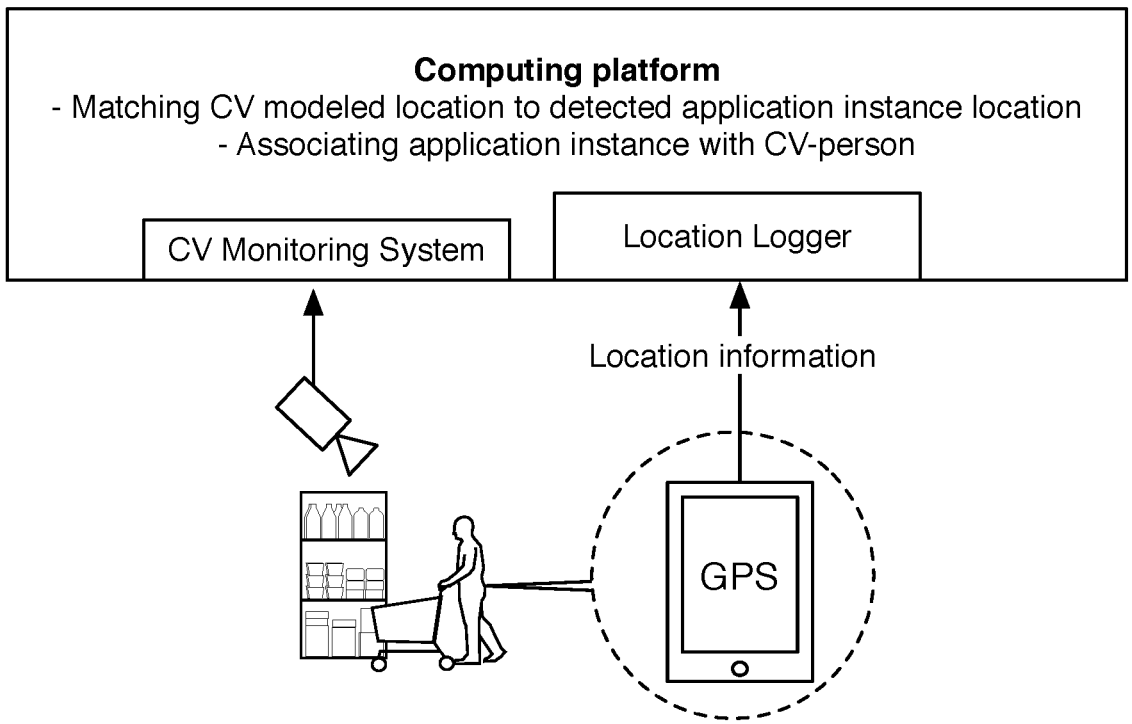

When using location detection, detecting the device instance can include detecting location of a device instance within the environment, and associating the device instance to a CV-person modeled with a corresponding location as shown in FIG. 9. Multiple samples of location and/or the change in location can additionally be used. In a manner similar to the Bluetooth beaconing approach, sampling across many regions can be used to reduce a pool of candidate CV-people down to one selected CV-person.

In a kinematic monitoring variation, the method may include, at the device instance, sensing device motion and/or orientation. This device motion and/or orientation can then be used in a variation where block S123 includes detecting an associated device instance with device motion that satisfies a synchronization condition with activity of the CV-person. In other words, motion of the device instance is matched to CV-person motion. An inertial measurement unit which can include accelerometers, gyroscopes, magnetometers (for direction), and/or other sensors may detect motion like walking motion, stops and stops, hand motion, body orientation changes, and the like. By comparing these actions to motion and orientation properties of a CV-person, a CV-person can be linked to a corresponding device instance. Use of motion as a synchronization mechanism may be dependent primarily on coincidence in time and may not factor in location though location can additionally be used.

In one variation, establishing an association may initiate confirming of the association, which functions to trigger user affirmation to establish an association. Confirming an association can include requesting confirmation through communication to a human (generally through a device instance). In one variation, an association may include a confirmed or possible association to a device instance. That device instance may have a communication address (e.g., phone number, application instance identifier, push notification endpoint, etc.). A message or notification can be transmitted to the communication address, and a human can confirm or deny the request. Upon receiving affirmative confirmation, the method can proceed with establishing the association. In another variation, the possible association may involve a user-record or a user-account, which may have a configured communication address like a phone number of application instance identifier. A message or notification can be similarly transmitted.

Confirmation may request explicit confirmation by a human. For example, a human may receive a text message saying, "Looks like you are at the supermarket. Replay 1 for yes and 2 for no". A confirmation may alternatively notify a human but require explicit denial to cancel/prevent the association. For example, a human may receive a push notification saying "Enjoy your shopping experience today! Select cancel if you received this in error". A confirmation may alternatively be automatically approved if a human selects a user-account option to not confirm new sessions. Confirmation could similarly be applied before performing particular interactions that depend on an established association. For example, a user may receive a push notification on an application asking if they want to automatically push checkout list information to a checkout station when they are within proximity.

Block S124, which includes establishing an association during a pairing process of a device instance, functions to have a device or more preferably an application facilitate establishment of an association. In some variations, a physical computing device may be designed to enter a pairing mode or continuously perform some pairing action. The pairing mode may be configured to generate an identifying signal through a user interface output of the device instance. As will be described below, the graphical display and speakers may both generate signals usable to detect a device. Similarly, sensed data may be collected and used during the pairing mode. In other variations, an application instance installed on a user device can be actively involved in performing actions that may enable unique detection of that application instance by the CV-system and thereby be associated with a CV-person. Herein, the pairing process of an application instance is described but it similarly applies to a device instance.

The pairing process is preferably initialized when the application instance becomes active (e.g., is brought into the foreground of a modal operating system). Activation of the application instance can result in the application instance registering the pairing state of the application instance with the CV monitoring system such that the CV monitoring system can begin to cooperatively establish an association. Once in the pairing mode, one or more signaling mechanisms may be used. The examples of signaling mechanisms can include use of a camera, a display or visual output, an audio system, an inertial measurement unit (IMU), application interactions, and/or stored data.

Figure 10A:
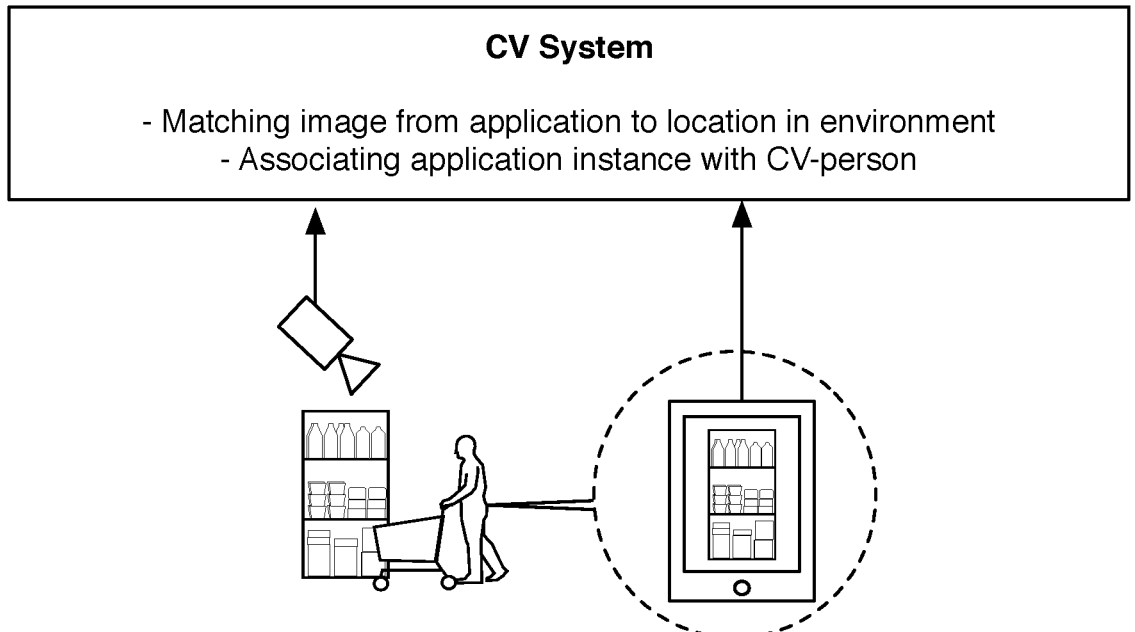
FIGS. 10A-10F are schematic representations of exemplary variations of establishing an association during a pairing process of a device instance.

As shown in FIG. 10A, an application instance can use the camera of the computing device to capture an image that can then be used to determine position. In one variation, various visual identifiers (e.g., a QR code or data encoded image) can be positioned throughout the store. Capturing image data from the application can be used to determine the position of the human operating the application when the image data contains the visual identifier. In a related variation, the human operator of the application may be directed to take a picture of a cart of selected items or some other artifact, which can be used as an identifier.

In another variation, the camera may be activated in the background with the goal of observing the scene. This activation of the camera may be based on detected orientation of the device (e.g., is the device being held up by human). Observations of the scene can act as a visual signature that can be mapped to images captured by the CV monitoring system as another approach to locating the device within the environment. For example, an application instance may capture images while the user is using the application. If an image of a shelf of items is captured, that image can be used to determine the location of the user within the store and thereby associate the application instance with a CV-person. Visual identifiers may be integrated into the environment such as on the ground, ceiling, shelving, walls, and the like to enhance mapping of visual signatures and positioning within the environment.

Figure 10B:
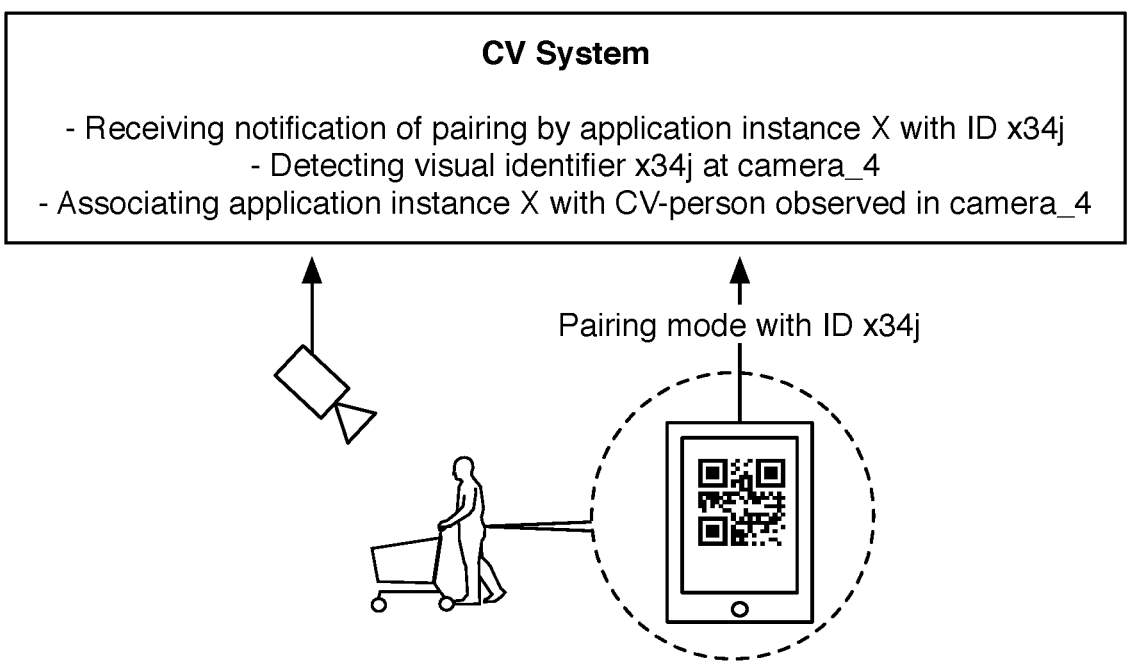

As shown in FIG. 10B, an application instance can use the display or other mechanisms for visual output in pairing an application instance with a CV-person. In a preferred variation, the display of a smart device can be set to display a visual identifier. The visual identifier can be a static graphic but could alternatively be a time variable visual display. When displaying the visual identifier the application instance communicates with the system so that detection of that visual identifier by the CV-system can be associated with the application instance. The imaging system used by the CV monitoring system will preferably be able to identify the displayed identifier and map an appropriate CV-person to the application instance. A visual identifier could alternatively be produced by other device elements such as an LED light.

Figure 10C:
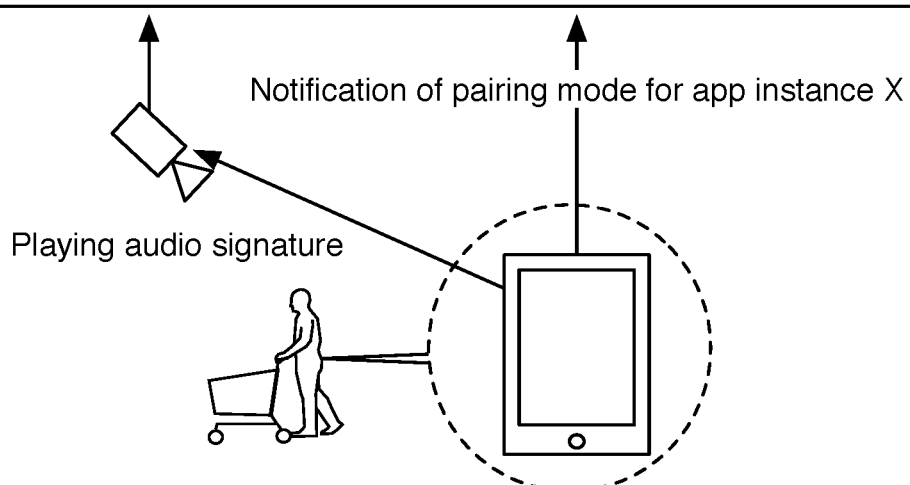

As shown in FIG. 10C, an application instance can use the audio output in pairing an application instance with a CV-person. An audio signal is generated with a unique identifier. Detection of that audio signal can then be used to determine location and then used in selecting candidate CV-people. The audio signal is preferably in a frequency range on the edge or beyond the hearing range of a human, but could also be a sound audible by a human. In one variation, the application instance generates the audio signal and microphones distributed within the environment can detect the audio signal. The microphones are associated with a general region within the environment or may be used in triangulating a more precise location. In another variation, speakers distributed across the environment generate audio signals that can be detected by an application instance. Each speaker preferably produces a unique audio signal such that the detected audio signal can be mapped to a positioned speaker and/or a location. Detection of multiple audio signals may be used to triangulate a more precise location.

Figure 10D:
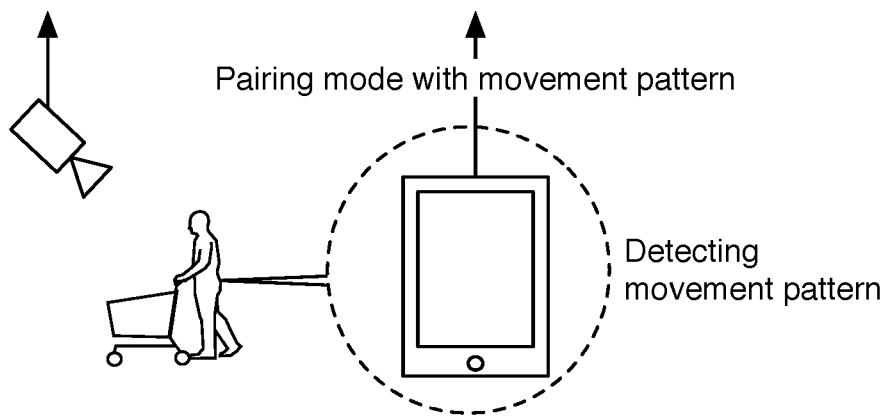

As shown in FIG. 10D, an application instance can use movement of the device as detected by an inertial measurement unit in pairing an application instance with a CV-person. The inertial measurement unit can include a digital accelerometer, gyroscope, magnetometer, and the like. During a pairing mode, the movements, orientation, and/or direction can be monitored to establish human movements. The CV monitoring system can similarly detect CV-person movements for candidate CV-people. CV-people with corresponding movement patterns at a similar time can be associated with the device instance.

Figure 10E:
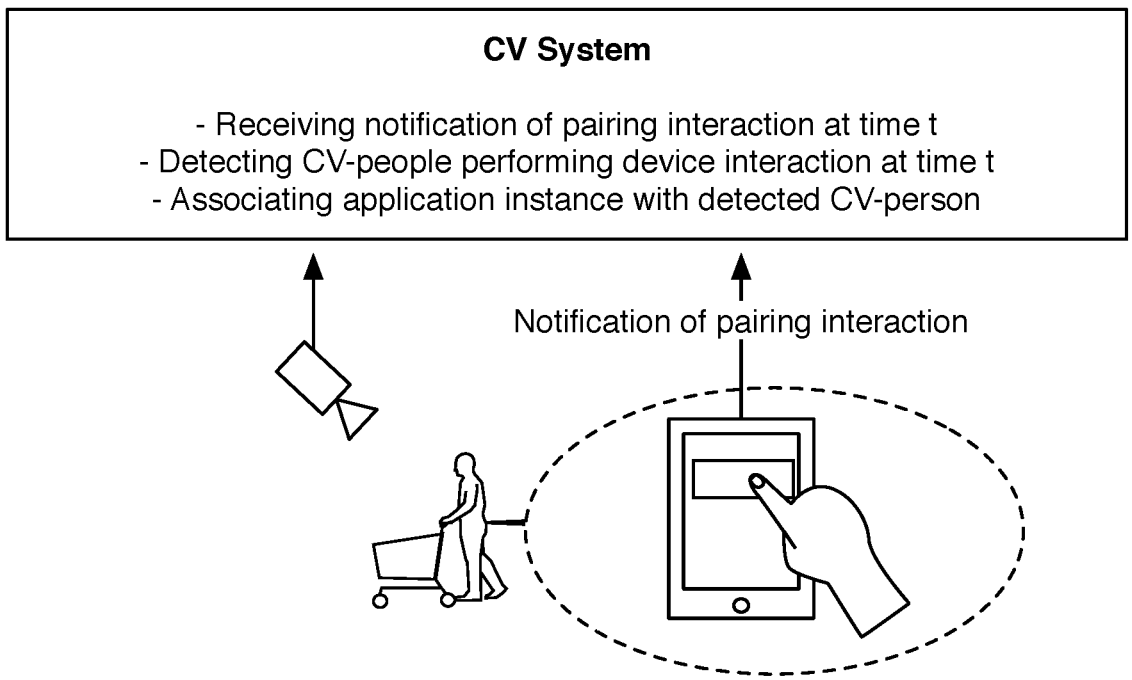

As shown in FIG. 10E, an application instance can use application interaction as a mechanism for pairing an application instance with a CV-person. An application interaction may be used by detecting human operation of the application and using the CV monitoring system to detect candidate CV-people performing similar actions. Application interaction may be used passively, which preferably use normal interactions with the application instance as CV-detectable actions. For example, the application instance may require a human to perform a check-in action to use an automatic self-checkout feature. The act of pulling out a smart device and pressing a check-in button on the application instance can be detected as actions performed by a CV-person. Additionally, the timing of activating the check-in button as detected by the application instance can be used to determine CV-people performing that action in synchronization with that act.

During a pairing mode of the application instance, block S120 can include directing a physical action by the user and detecting a corresponding physical action of the CV-person. In matching the sensed motion at the device instance to modeled motion of the CV-person, the device instance can be associated with the CV-person. For example, Application interactions may be actively directed by the application instance where an application instance instructs a human to perform some action or gesture such as waving his or her hand, holding out the smart device, pointing at an object, or any suitable action. These human gestures may be more detectable than interactions with the application instance.

The timing of the actions can be orchestrated by the application instance. Additionally, the nature of action may be controlled and changed to help in establishing the association. For example, different types of actions may be directed so that the type as well as location and timing can better establish an association with high confidence. Device movement as discussed above can similarly be used in combination with directed actions.

Figure 10F:
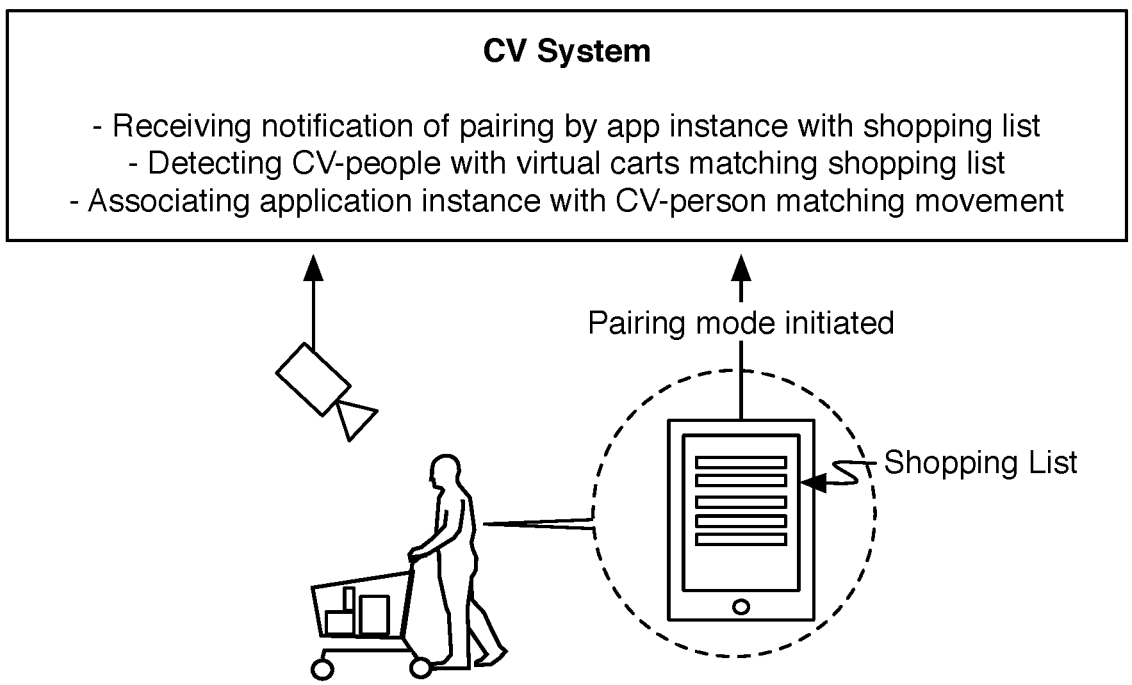

Establishing an association during a pairing process of a device instance may additionally or alternatively use collected information from the application instance. When a pairing mode is activated, preferably by the human, then the system may begin using stored information associated with the application instance and/or account to establish an association. As one specific example, if a customer has entered a shopping list into an application, then the CV monitoring system can compare that shopping list to the checkout lists of current CV-people. A CV-person detected to have some subset of the shopping list may be associated with that application instance as shown in FIG. 10F. Shopping history, favorited products, and/or other information can similarly be used.

Block S125, which includes collecting real-time image data of a CV-person in the environment and applying a form of biometric identification, functions to facilitate automatic biometric analysis of a CV-person. A variety of types of biometric identification techniques may be used such as facial identification, gait identification, retina identification, physical property identification (e.g., height, weight, gender, etc.), and/or other forms of biometric identification. Biometric analysis may be used to establish a human association when a unique human identity is determined. Automatic biometric analysis may additionally establish associations with other associative elements like a user-record.

As an alternative or additional approach to biometric identification, biometric identification sensing capabilities of a computing device may be used when a computing device can be communicatively coupled and associated with a CV-person (e.g., using one of the approaches above). This variation can include, at the device instance, receiving biometric identification; and associating human identity confirmation with the modeled person and user-record. Receiving biometric identification can act to confirm or specify the human identify of the current user of the computing device. Receiving biometric identification could include checking a fingerprint, facial pattern, voice, vital sign (e.g., heart rate, respiration rate), and/or any suitable biometric identification. These may be provided on a personal computing device or some shared computing device like a check-in kiosk in the environment.

Block S126, which includes receiving registration at a registration device, functions to establish an association during active registration of a user-record, user-account, human, and/or application instance. The registration device can be a kiosk or check-in station installed in the environment. The human will preferably perform some interaction with the registration device to establish an association. The mode of registering at the registration device can take many forms such as swiping/scanning a card (e.g., a payment card), presenting NFC device, QR code or barcode scanning, biometric scanning, entering of account credentials, entering a pin code, and/or any suitable action. A registration device could additionally include biometric sensors for establishing human associations. Some of these registration techniques may not require possession of a device instance and/or other physical tokens. This may provide an option for humans that want to participate in the system without using a physical device. Location of the registration device(s) and proximity of a CV-person during the time of registration can be used to associate with a CV-person. In one alternative, the method may use registration regions where some registration can occur without a physical registration device.

Figure 11:
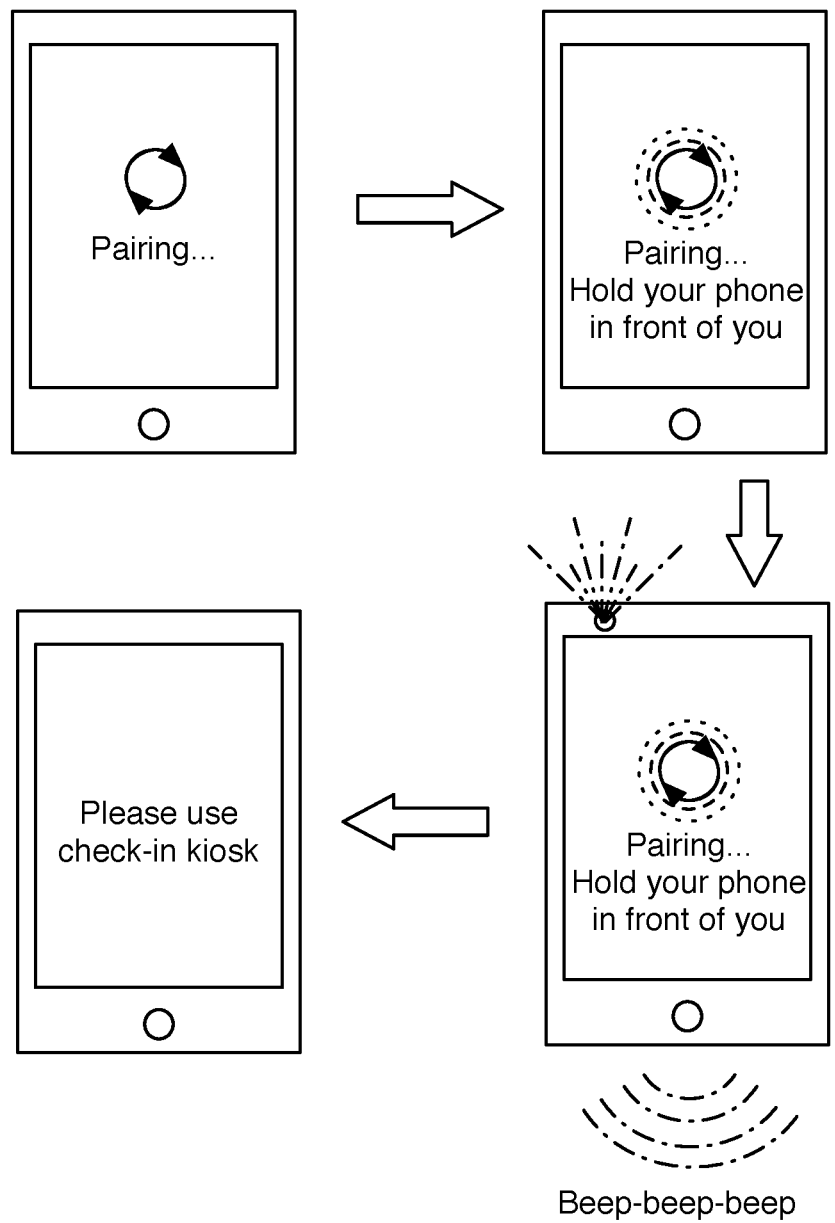
FIG. 11 is a schematic representation of a sequence of association mechanisms.

The mechanism for establishing an association can be one or more of the mechanisms described herein. In some cases, multiple association mechanisms are used in combination to narrow a pool of candidate CV-people to a single confirmed CV-person. The method can additionally redundantly confirm associations as a form of multi-factor authentication to enhance accuracy, reliability, and/or security. In one variation, establishing an association can include progressively attempting a sequence of association mechanisms. When one association mechanism does not succeed, a backup association mechanism can be used. The sequence of association mechanisms may start off with less intrusive user experiences and then escalates to association mechanisms with higher reliability but possibly more reliance on human participation. In one example shown in FIG. 11, establishing an association to an application instance can initialize by passively using the location of the application instance and identification of a displayed static graphic. If an association is not established, then the application may escalate to displaying an animated graphic with instructions to hold their phone outwards with display up. If an association is not established again the application instance can start an audible jingle while flashing an LED light. If an association is still not established, the application instance can direct the user to use a check-in station. From the user perspective, this or pairing process can be presented as a seamless pairing process that slowly builds up. Ideally, an association is established quickly so that most users do not experience the more obvious association mechanisms.

There may also be different modes of associations that may depend on the associative elements, mechanism for establishing associations, and/or user selected options. There could be an anonymous association where a CV-person is treated as a generic user. There could be an incognito association mode, where information and capabilities enabled by associations to a user-record, user-account, application record, and/or a human may be used but where the session is not committed to the data records of those associations within the system. There could also be various forms of confirmed identity associations. For example, an association can be an association with confirmed human-identity wherein secure permissions can be enabled such as those that traditionally require review of form of physical identification.

Associations are preferably established prior to performing some action requiring permission confirmed through the association. In a preferred implementation, associations are established in response to nearing or entering an environment. However, the method can support retroactively applying an association. As an illustration of the flexibility in establishing an association, the method can support establishing an association immediately prior to the human entering the store and being acquired as a CV-person, immediately before a transaction during an automatic self-checkout, and/or in conjunction with the transaction. Associations can additionally be built up during the duration of the time that the human is in the environment, wherein establishing an association can include wherein establishing an association through multiple associative mechanisms performed at different locations and times in the environment. For example, a CV-person may initially be associated with a user record, then an application instance can be added and then a human association. Associations can additionally happen after a CV-person has left the store where actions like a billing transaction can happen in absentia. This can even happen over multiple visits to the environment by a human. For example, a shoplifter that later creates a user-account may have previous activities and illicit behavior retroactively associated with the new user-account.

Block S130, which includes directing the user interaction experience at least in part based on the combination of the modeled person of the computer system and at least the user-record functions to apply the established association in augmenting one or more process of the CV-based computing system. Once an association is established the information and capabilities of the different associated elements may be used cooperatively. At some level, block S130 is used to coordinate the modeled state of a CV-person with state at another associated element.

A CV-person association can use data in enhancing CV processing of image data and similarly extract information that can be provided to associative elements.

A user-record and/or user-account can accept information from other associated elements in building up a data profile. The information of the user-record and/or user-account can be used in enhancing operation of the CV-system and/or other devices such as an application instance or a connected device within the environment.

A device or application association may be able to use the extracted information from the CV monitoring system. The device and application will additionally have some state or data that can be synchronized with associated elements. The device or application can also expose an interface for receiving user input or using other device features such as the camera, biometric authentication elements, and the like. A device association can additionally enable a token-based form of authentication for setting privileges.

A human association preferably provides a biometric factor of authentication, which can be used to enable various permissions and privileges. A human association can preferably provide a more human specific level of authentication than a device or application association.

An association is preferably applied by exposing data and/or state of at least one associative element to a second associative element. Within the automatic self-checkout use case, an association of a CV-person to a user-record can expose data records stored in connection to the user-record such as shopping history, payment information, and user settings. Having access may enable automatic billing of detected actions of a CV-person during a checkout transaction. Shopping history, shopping lists, and/or other information can similarly be accessed and used by the CV monitoring system to enhance CV-based predictions. User settings, configuration, and preferences may be set in association with a user-account. However, even anonymous users with only a user-record can have the option of setting personalized configuration such as privacy settings. For example, any user may be enabled to approach a device instance installed in the environment such as a help kiosk or checkout kiosk, and in synchronizing the user-record with the state of that device instance settings linked to that user-record can be modified while the user is present at that device instance.

Three preferred variations of directing the user interaction experience can include enforcing permissions set through the association S132, synchronizing state at a device instance with the CV monitoring system S134, and/or controlling a connected device within the environment in coordination with a CV-person and at least one associated element S136.

Block S132, which includes enforcing permissions set through the association, functions to enable, disable, or alter functionality in coordination with properties of association. Different associative elements and/or modes of establishing an association can be used to set permissions for an interactive experience. Accordingly, permissions can be set in based in part on properties of established associations. In one variation permissions are based on the association topology. For example, some permission may depend on validated human identity or validated device instance detection. In other variations, permissions may be set for particular associative elements such that establishing an association with that associative element can enable that permission setting. Setting a permission can include granting or withholding a permission/privilege setting.

Permissions within a CV-based computational application for commerce can be used to enable purchases of controlled substances like alcohol, tobacco, firearms, medications, limited purchase items (e.g., pseudoephedrine), and other items. Permissions can also be used for business practice restrictions such as limiting a customer to purchasing a specified number of a sales item. Permissions can also be used in other use cases to restrict or permit access to different regions of the environment, interaction with different objects, automatic security line processing, or regulating any action observed through the CV monitoring system.

In one implementation, some subsets of permissions may additionally include human validation. For example, the use of controlled substances may require worker validation of an identification document such as a driver's license. The setting of these privileges once established can be maintained for a set duration such as while the human is within the environment. For example, a shopper may be alerted to show their ID to a worker after they add alcohol to their cart. Similarly, a worker could be notified of a shopper that has a pending validation, and the worker could be directed to the shopper to complete validation. Checking an ID is one illustrative example of temporarily attaching a permission to an association. Permissions can additionally be validated by automatically validating credentials. For example, a driver's license can be scanned. Additionally, the facial imagery of the license can be compared to facial biometrics of the CV-person. As another option, a physical token such as an RFID card key could be used to validate credentials. Other forms of permissions and validation processes can similarly be used.

Figure 12:
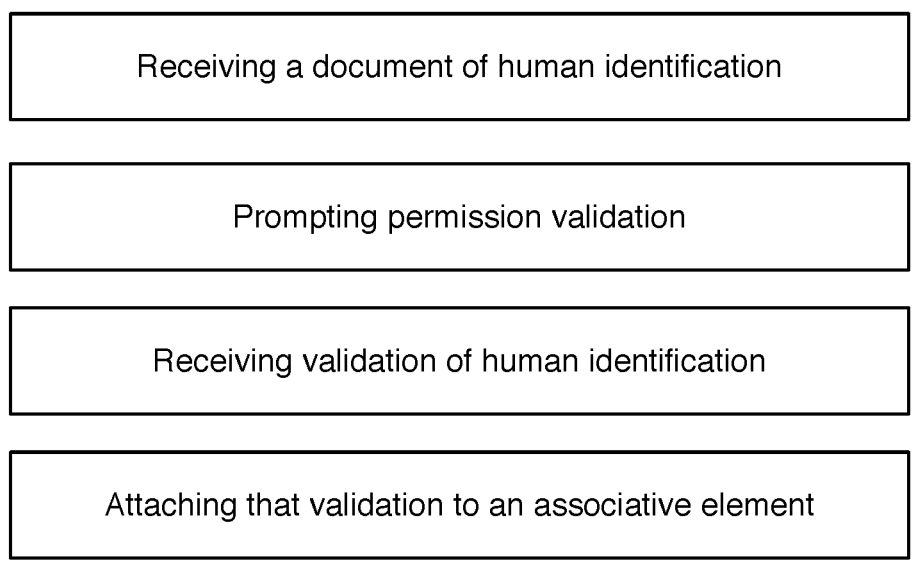
FIG. 12 is a flowchart representation of attaching validation to an associative element.

As one exemplary process supporting commerce involving controlled substances, a multi-stage process can establish verified identity thereby enabling associations with validated permissions. The process can be used in combination with the method of the preferred embodiment and can include: receiving a document of human identification, prompting permission validation, receiving validation of human identification, and attaching that validation to an associative element as shown in FIG. 12. When an association is later confirmed with that associative element then that CV-person can be granted permissions to perform actions requiring those permissions such as purchase alcohol. In one variation, the permissions are attached to a human association wherein biometric identification of the human is needed to permit purchase of controlled substances. In another variation, the permissions can be attached to physical token such as an application instance or RFID card.

Receiving a document of human identification preferably includes receiving an image or taking a picture of the document. For example, a user can use an application to take a picture of the front and back of a driver's license. Automatic validation of the document may be applied. Then the application may instruct the human to validate the document on the next visit to enable the permissions. The worker can then perform human-level validation of the document of human identification and approve the permission validation from a worker-controlled system.

In one implementation, a subset of permissions may be validated once and used during subsequent sessions. In some cases, the permissions can be preserved indefinitely, while in other cases, the permissions may expire based on certain conditions. One-time validation can similarly use the approaches discussed above. Once validated, permissions can be added to a user-record for subsequent use.

Permissions can additionally be conditionally revoked or reduced based on rules for maintaining associations. Basic rules may be set based on various conditions. For example, an association may expire after a certain amount of time. Permissions could alternatively be revoked based on CV-based detection of different conditions. For example, detection of a CV-person exhibiting unusual behavior (e.g., irregular behavior, elevated noise, excessive disruption to objects), consuming a number of drinks above a threshold, or crossing do-not cross lines may be used in detecting intoxication in which case permission for a purchase of controlled substances can be revoked. This could potentially be used to automatically enable alcoholic beverages to be sold while adhering to laws and regulations. Other exemplary conditions may be based on the account balance or state of payment information. Revocation and/or reduction of permissions may be permanent, restored through an external event, and/or restored after some passage of time or another condition.

Block S134, which includes synchronizing state at a device instance with the CV monitoring system, functions to relay information between a device instance and a CV monitoring system. This synchronization with the CV monitoring system preferably synchronizes data specific to the CV-person and/or device instance. Data and information can flow in one direction from one associative element to another, but data and information could similarly flow in multiple directions between associative elements. As the CV monitoring system will preferably be used simultaneously by multiple distinct humans, this synchronization enables personalized interaction with the CV monitoring system while simultaneously sharing the CV monitoring system with multiple users.

In one variation, information from the device instance or application instance can be synchronized with the CV monitoring system to enhance CV analysis, alter business logic, and/or otherwise alter the interactive experience for a human. This variation may include receiving user input communicated from the device instance, and then executing the user interactive experience based in part on the combination of modeled state of the CV monitoring system and the user input.

In another variation, information generated by the CV monitoring system can be communicated to the application instance. In this variation, block S134 can include communicating modeled state of the CV monitoring system to the device instance. For example, the checkout list of a CV-person could be communicated to an application instance. In some cases, the method can support conflict resolution between a CV monitoring system model and user application model. For example, if a user deletes a product from a checkout list from a user application, but the CV monitoring system still predicts the user possesses that object, some rule may be used to resolve the conflict.

Figure 13:
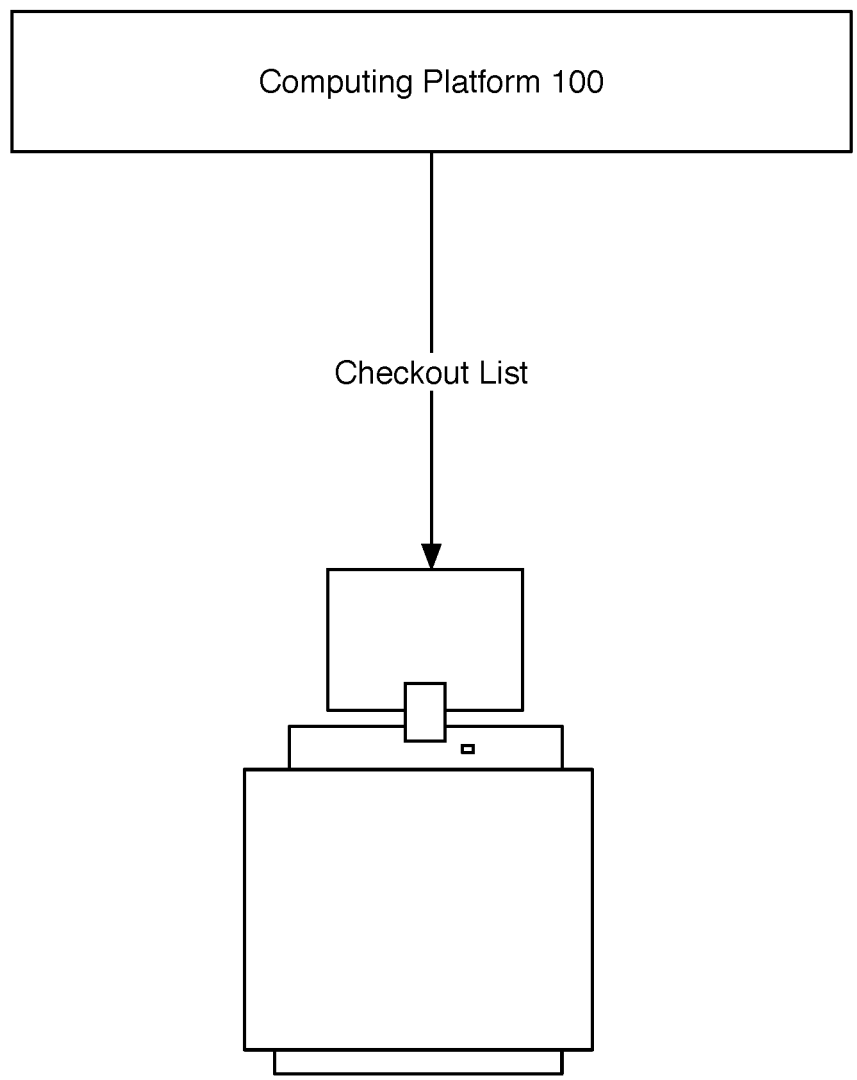
FIGS. 13-15 are schematic representations of coordinating with a secondary device.
Figure 14:
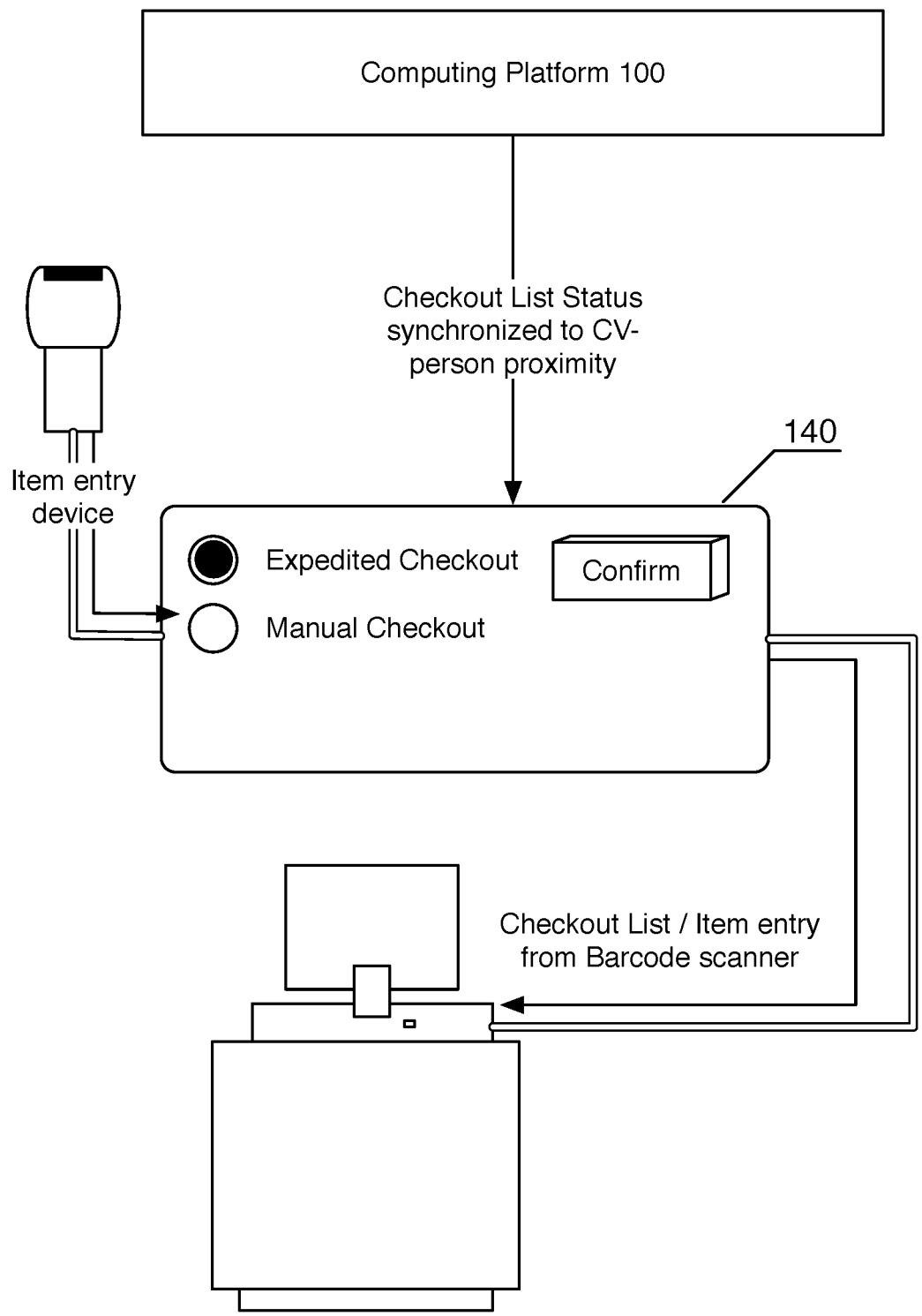
Figure 15:
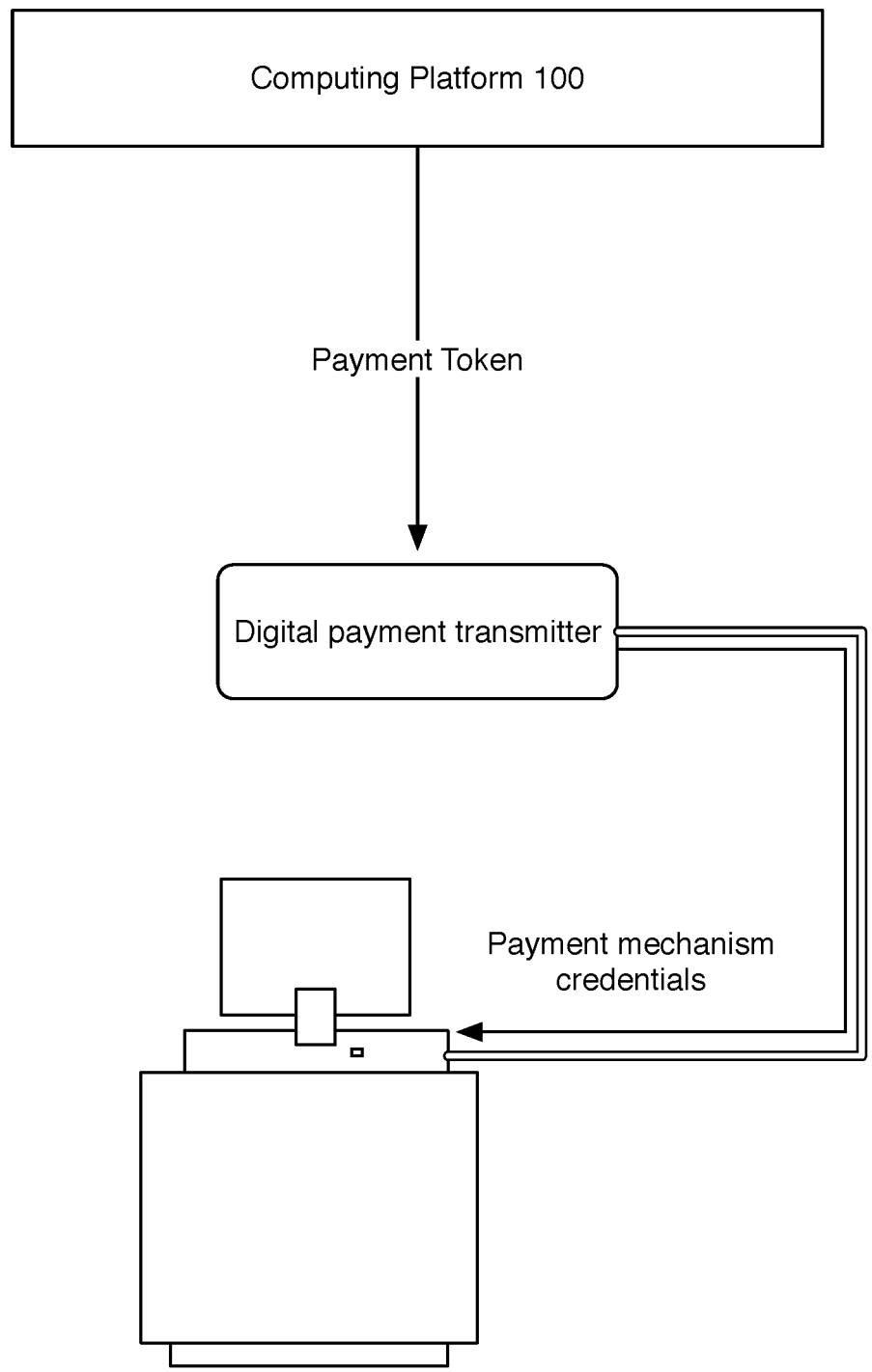

Block S136, which relates to S134 and includes coordinating with a secondary device, functions to control an environment-controlled device in response to an association and the CV-person. This is a variation of block S134 where the computing device is a secondary computing device present in the environment. The secondary device can be a kiosk, computing station, networked smart device (e.g., smart lock, smart lights, smart scales, etc.), and/or any suitable computing device. The secondary device is generally a device installed and provided by the environment such that there is no human-specific association (i.e., multiple humans may interact with the secondary device). Block S136 can include detecting the secondary device in proximity of the CV-person and synchronizing state between the association of the CV-person and the secondary device. As with Block S134, this may include communication of state and data to and from the secondary device as shown in FIG. 13. The secondary device can be detected based on spatial proximity. In one variation a proxy interface device may be used as an accessible computing device to interface with a target computing device (e.g., a checkout station) as shown in FIG. 14. The secondary device proximity may alternatively depend on detecting interaction with the secondary computing device and then identifying a predicted CV-person responsible of that interaction.

Coordinating interactions with a secondary device can be used to enable functionality where a human can approach a computing device and the device can automatically customize its state for the human. This may similarly be used for automatically logging-in to a user account based on the permissions. But can additionally facilitate interactions where a user without a user-account can walk up to a kiosk, and the kiosk automatically provides information obtained by the CV-system. Similarly, a user could provide input to the CV monitoring system as actions performed through the secondary computing device can be communicated to the CV monitoring system as input uniquely associated with that human.

In one use case this may be used to automatically communicate a generated checkout list associated with a user-record to a checkout station. In another use case this could be used to automatically communicate payment mechanism credentials to execute a financial transaction as shown in FIG. 14.

In practice the method is preferably executed throughout the time a human is present in the environment. Accordingly, when the human enters the environment subject to monitoring by the CV monitoring system, a CV-person can be detected. In one variation, detection of a CV-person can trigger an association establishment process. If an association can be established and if that can be used to select an existing user-record/user-account, then that can be associated with and used for that CV-person. If an association cannot be established or if no user-record/user-account exists for an associative element, then a new default user-record can be created and used. In the event a later established association, identified a previously unknown user-record or user-account, then the current user-record can be reconciled with the newly established one. In one implementation, multiple user-records and user-accounts may be maintained separately until some condition triggers merging/reconciliation. In some cases, an association may be established with low confidence and therefor merging a linked user-record may be undesirable until more confidence is established. Greater confidence in user-record/user-account associations can be established through more robust associative mechanisms and/or when multiple associations indicate similar associations.

In general, establishing an association may be performed as a person enters an environment. However, the method may similarly be applied across an environment such that modeling of a person can be resilient to interruptions in tracking of a CV-person. For example, a shopper may have selected items monitored after entering the store. Tracking of that person may be interrupted when the shopper enters an unmonitored space such as a bathroom. When the shopper reenters a monitored space, the reestablishment of an association with an identifying associative element can enable the previous user-record to be bridged to this new CV-person.

Figure 16:
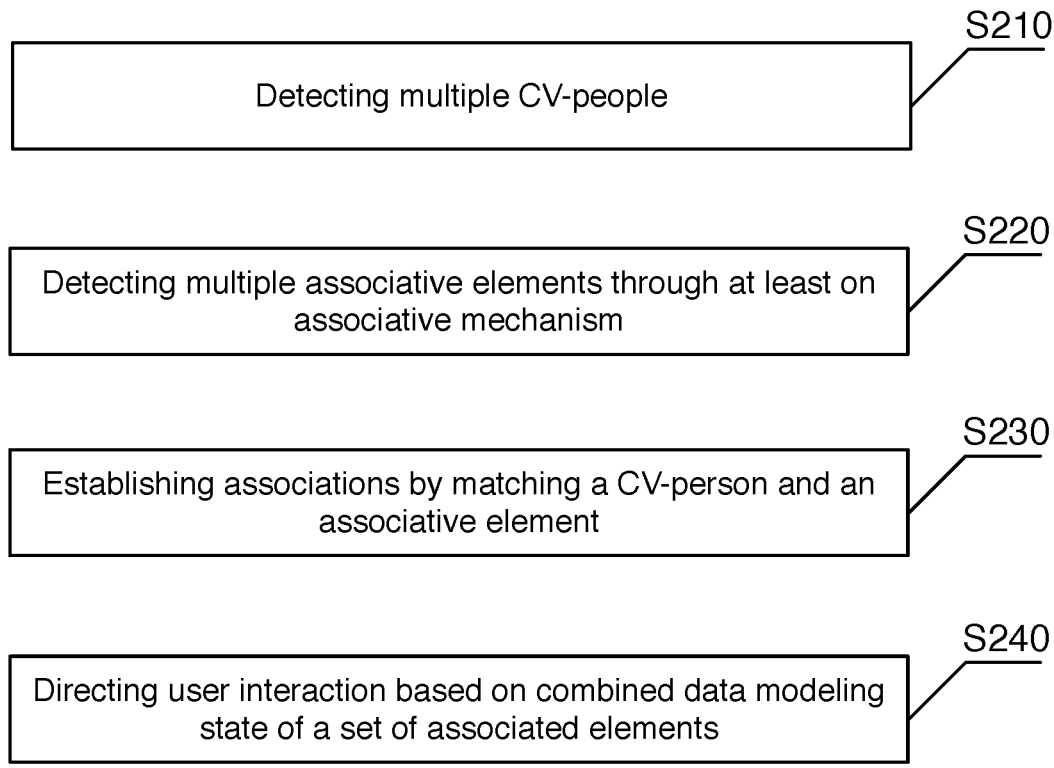
FIG. 16 is a flowchart representation of a variation of the method applied across multiple humans.

The method is preferably applied across multiple participants simultaneously such that associations are appropriately created for different people in the environment. As shown in FIG. 16, the method when applied across multiple participants could alternatively be described as including: detecting multiple CV-people S210, detecting multiple associative elements through at least on associative mechanism, S220, establishing associations by matching a CV-person and an associative element S230, and directing user interaction based on combined data modeling state of a set of associated elements S240. The variations described above for blocks S110, S120, and S130 can similarly be applied in this approach. The filtering of candidate CV-people and identifying associative elements can be facilitated by performing multiple instances of establishing an association. Different associations performed using different mechanisms, at different times, and at different locations can act to isolate unique matches between a CV-person and identifying associative elements. In practice, a computing platform is simultaneously monitoring the environment for potential associations. When one is found the computing platform evaluates that association to identify candidate associations and potentially unique pairings of associative elements. A longitudinal history of candidate associations can be evaluated along with new candidate associations, which may facilitate resolving to a single unique association.

The above variations of the method could similarly be applied. Furthermore, different techniques may be applied for different users within an environment depending on different scenarios. For example, one user may have one associative mechanism employed to establish one or more associations, while a second user may have a second associative mechanism employed to establish a different set of associations.

The systems and methods of the embodiments can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated with apparatuses and networks of the type described above. The computer-readable medium can be stored on any suitable computer readable media such as RAMs, ROMs, flash memory, EEPROMs, optical devices (CD or DVD), hard drives, or any suitable device. The computer-executable component can be a processor but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

We claim:

1. A method comprising:
through a computer vision monitoring system, detecting and tracking a computer vision modeled person within an environment;
establishing a first instance of an association between the computer vision modeled person and a user-record, which comprises:
receiving registration of the user-record at a shared computer kiosk in the environment, and
detecting the shared computer kiosk being coincident in proximity to the computer vision modeled person and thereby associating the computer vision modeled person and the user-record linked through the shared computer kiosk; and
directing a user interaction experience at least in part based on the combination of the modeled person and at least the user-record.

2. The method of claim 1, further comprising establishing a second association between the computer vision modeled person and a personal computing device, which comprises detecting the personal computing device with coincident proximity to the computer vision modeled person and associating the computer vision modeled person, the personal computing device, and the user-record.

3. The method of claim 2, further comprising authenticating a user-account in the personal computing device; and associating the user-account and the user-record.

4. The method of claim 2, wherein directing the user interaction experience comprises communicating a modeled state of a checkout list of the computer vision modeled person to an application instance operating on the personal computing device.

5. The method of claim 4, wherein directing the user interaction experience further comprises receiving user input on the application instance to delete a product from the checkout list and resolving a conflict between the computer vision model of the checkout list and the application instance model of the checkout list.

6. The method of claim 2, further comprising receiving user input communicated from the personal computing device; and wherein directing the user interaction experience comprises executing the user interactive experience based in part on the combination of modeled state of the computer vision monitoring system and the user input.

7. The method of claim 2, wherein detecting the personal computing device comprises detecting a device signature through wireless communication.

8. The method of claim 2, wherein detecting the personal computing device comprises detecting location of the personal computing device within the environment.

9. The method of claim 2, wherein detecting the personal computing device comprises entering the personal computing device into a pairing mode configured to generate an identifying signal through a user interface output of the personal computing device.

10. The method of claim 2, wherein detecting the personal computing device comprises, at the personal computing device, directing a physical action of the user and detecting a corresponding physical action of the modeled person and thereby associating the personal computing device with the computer vision modeled person.

11. The method of claim 2, further comprising, at the personal computing device, sensing device motion using an inertial measurement unit of the personal computing device and wherein establishing the second association between the computer vision modeled person and the personal computing device comprises detecting the personal computing device having device motion that satisfies a synchronization condition with computer vision modeled person activity.

12. The method of claim 2, further comprising at the personal computing device receiving biometric identification; and associating human identity confirmation with the computer vision modeled person and user-record.

13. The method of claim 2, further comprising establishing a third association between the computer vision modeled person and a human identity, which comprises biometrically identifying a human through the computer vision system and associating a human identity with the computer vision modeled person, the personal computing device, and the user-record.

14. The method of claim 2, further comprising, prior to establishing an association between the computer vision modeled person and the personal computing device, requesting confirmation of the association of the personal computing device, and establishing the second association upon receiving affirmative confirmation of the association.

15. The method of claim 1, further comprising:
through the computer vision monitoring system, detecting and tracking a second computer vision modeled person within the environment;
establishing a second instance of an association between the second computer vision modeled person and a second user-record, which comprises:
receiving registration of the second user-record at the shared computer kiosk, and
detecting the shared computer kiosk being coincident in proximity to the second computer vision modeled person and thereby associating the second computer vision modeled person and the second user-record linked through the shared computer kiosk; and
directing a second user interaction experience at least in part based on the combination of the second modeled person and at least the second user-record.

16. The method of claim 1, wherein the user-record is an anonymous user-record.

17. The method of claim 1, wherein receiving registration comprises receiving account credentials of a user-account and thereby associating the computer vision modeled person and the user-account.

18. The method of claim 1, further comprising setting permissions based in part on properties of established associations with the CV-person; and wherein directing the user interaction experience comprises enforcing permissions during the user interaction experience.

19. The method of claim 1, further comprising: receiving a document of human identification; prompting permission validation; receiving validation of human identification; and wherein directing the user interaction experience comprises permitting actions based in part on the receiving validation.

20. The method of claim 1, wherein receiving registration comprises scanning a card and thereby establishing registration of the user-record at the shared computer kiosk.

21. The method of claim 20, wherein the card is a payment card.

22. The method of claim 1, further comprising authenticating a user-account at the shared computer kiosk; and associating the user-account and the user-record.

23. The method of claim 1, wherein directing the user interaction experience further comprises communicating modeled state of a checkout list of the computer vision modeled person to the shared computer kiosk.

24. The method of claim 23, wherein directing the user interaction experience further comprises receiving user input at the shared computer kiosk to delete a product from the checkout list on the shared computer kiosk, and resolving a conflict between the computer vision model of the checkout list and the checkout list on the shared computer kiosk.

25. The method of claim 1, further comprising receiving user input at the shared computer kiosk; and wherein directing the user interaction experience comprises executing the user interactive experience based in part on the combination of modeled state of the computer vision monitoring system and the user input.

26. The method of claim 19, wherein permitting actions based in part on the receiving validation comprises permitting purchasing of controlled substances.

27. The method of claim 19, wherein the validation of human identification validates age of the computer vision modeled person.

28. The method of claim 1, wherein receiving registration of the user-record at the shared computer kiosk comprises registering a registration device.

29. A system comprising:
one or more computer-readable mediums storing instructions that, when executed by the one or more computer processors, cause a computer vision monitoring computing platform to perform operations comprising:
detecting and tracking a computer vision modeled person within an environment;
establishing a first instance of an association between the computer vision modeled person and a user-record, which comprises:
receiving registration of the user-record at a shared computer kiosk in the environment, and
detecting the shared computer kiosk being coincident in proximity to the computer vision modeled person and thereby associating the computer vision modeled person and the user-record linked through the shared computer kiosk; and
directing a user interaction experience at least in part based on the combination of the modeled person and at least the user-record.

30. The system of claim 28, wherein directing the user interaction experience further comprises communicating a modeled state of a checkout list of the computer vision modeled person to the shared computer kiosk.

31. The system of claim 28, wherein receiving registration of the user-record at the shared computer kiosk comprises registering a registration device.

32. The system of claim 28, further comprising establishing a second association between the computer vision modeled person and a personal computing device, which comprises detecting the personal computing device with coincident proximity to the computer vision modeled person and associating the computer vision modeled person, the personal computing device, and the user-record.

33. The system of claim 28, further comprising: receiving a document of human identification; prompting permission validation; receiving validation of human identification; and wherein directing the user interaction experience comprises permitting actions based in part on the receiving validation.

34. A non-transitory computer-readable medium storing instructions that, when executed by one or more computer processors of a computer vision monitoring computing platform, cause the computing platform to perform operations including:
detecting and tracking a computer vision modeled person within an environment;
establishing a first instance of an association between the computer vision modeled person and a user-record, which comprises:
receiving registration of the user-record at a shared computer kiosk in the environment, and
detecting the shared computer kiosk being coincident in proximity to the computer vision modeled person and thereby associating the computer vision modeled person and the user-record linked through the shared computer kiosk; and
directing a user interaction experience at least in part based on the combination of the modeled person and at least the user-record.

35. The non-transitory computer-readable medium of claim 34, wherein directing the user interaction experience further comprises communicating a modeled state of a checkout list of the computer vision modeled person to the shared computer kiosk.

36. The non-transitory computer-readable medium of claim 34, wherein receiving registration of the user-record at the shared computer kiosk comprises registering a registration device.

37. The non-transitory computer-readable medium of claim 34, further comprising establishing a second association between the computer vision modeled person and a personal computing device, which comprises detecting the personal computing device with coincident proximity to the computer vision modeled person and associating the computer vision modeled person, the personal computing device, and the user-record.

38. The non-transitory computer-readable medium of claim 34, further comprising: receiving a document of human identification; prompting permission validation; receiving validation of human identification; and wherein directing the user interaction experience comprises permitting actions based in part on the receiving validation.

* * * * *